(12) United States Patent
Winkel

(10) Patent No.: US 9,159,047 B2
(45) Date of Patent: *Oct. 13, 2015

(54) PROJECTED IMAGE PLANOGRAM SYSTEM

(71) Applicant: James T. Winkel, Wayzata, MN (US)

(72) Inventor: James T. Winkel, Wayzata, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/275,513

(22) Filed: May 12, 2014

(65) Prior Publication Data

US 2014/0324642 A1 Oct. 30, 2014

Related U.S. Application Data

(63) Continuation-in-part of application No. 13/674,627, filed on Nov. 12, 2012.

(60) Provisional application No. 61/558,834, filed on Nov. 11, 2011, provisional application No. 61/680,576, filed on Aug. 7, 2012.

(51) Int. Cl.
*G06K 9/36* (2006.01)
*G06Q 10/08* (2012.01)

(52) U.S. Cl.
CPC .................................. *G06Q 10/087* (2013.01)

(58) Field of Classification Search
CPC ............................... G06K 7/14; G06K 7/1404

USPC ........................................ 235/462.1, 383, 385
See application file for complete search history.

(56) References Cited

U.S. PATENT DOCUMENTS

| 8,049,621 | B1* | 11/2011 | Egan | 340/572.1 |
| 8,229,781 | B2* | 7/2012 | Zenor et al. | 705/7.31 |
| 2006/0259371 | A1* | 11/2006 | Perrier et al. | 705/26 |

* cited by examiner

*Primary Examiner* — Daniel St Cyr
(74) *Attorney, Agent, or Firm* — Christensen Fonder P.A.

(57) ABSTRACT

A method of generating a planogram for a retail display. The method includes selecting a merchandise item having a merchandise identifier; selecting a fixture associated with the merchandise item, the fixture having a fixture identifier; determining a display location for the fixture or for the merchandise item, the display location being one of a plurality of display locations of a merchandise display structure, the merchandise display structure being configured to receive the fixture and to display the merchandise item; generating a marker code based on the merchandise identifier and the fixture identifier, the marker code identifying the merchandise item and the fixture; and generating a planogram data file, the planogram data file including data corresponding to the marker code and the display location, the marker code identifying the merchandise and fixture.

28 Claims, 18 Drawing Sheets

Retailer Planogram Layout

| DISPLAY TYPE | | | CHILDRENS SOCKS | |
|---|---|---|---|---|
| DISPLAY SIZE : 3X84 | | | SET DATE: | 9/20/2010 |

| Lead In | Base | Description | | UPC |
|---|---|---|---|---|
| A | 1 | IBM HDR LPP | FRONT E/C | 4926122222471 |
| B | 11 | 1 PK SOCK | CIRCO CAMO 0M-6M | 4831622630057 |
| E | 11 | 1PK SOCK | CIRCO CAMO 6M-12M | 4831622630524 |
| H | 11 | 1PK SOCK | CIRCO CAMO 12M-24M | 4831622630531 |
| K | 11 | 1PK SOCK | CIRCO CAMO 2T-3T | 6305466630546 |
| N | 11 | 1PK SOCK | CIRCO EDGE NIGHT 0M-6M | 6305938309593 |
| Q | 11 | 1PK SOCK | CIRCO EDGE NIGHT 6M-12M | 4831622630609 |
| T | 11 | 1PK SOCK | CIRCO EDGE NIGHT 12M-24M | 4831622630616 |
| W | 11 | 1PK SOCK | CIRCO EDGE NIGHT 2T-3T | 4831622630623 |
| B | 21 | 1PK SOCK | CIRCO ALMND BLSSM 0M-6M | 4831622645215 |
| E | 21 | 1PK SOCK | CIRCO ALMND BLSSM 6M-12M | 4831622645222 |
| H | 21 | 1PK SOCK | CIRCOALMND BLSSM 12M-24M | 4831622645239 |
| K | 211 | 1PK SOCK | CIRCO ALMND BLSSM 2T-3T | 4831622645246 |
| N | 21 | 1PK SOCK | CIRCO HETHR TAN 0M-6M | 4831622689703 |
| Q | 21 | 1PK SOCK | CIRCO HETHR TAN 6M-12M | 4831622689710 |
| T | 21 | 1PK SOCK | CIRCO HETHR TAN 12M-24M | 4831622689727 |
| W | 21 | 1PK SOCK | CIRCO HETHR TAN 2T-3T | 4831622689734 |
| B | 31 | 1PR CI SOCKS | SKY LAVENDAR 0-6M | 4831627152314 |
| E | 31 | 1PR CI SOCKS | SKY LAVENDAR 6-12M | 4831627152321 |
| H | 31 | 1PR CI SOCKS | SKY LAVENDAR 12-24M | 4831627152338 |
| K | 31 | 1PR CI SOCKS | SKY LAVENDAR 2-3YRS | 4831671522345 |
| N | 31 | 1PR CI SOCKS | REALLY RED 0-6M | 4831622715505 |
| Q | 31 | 1PR CI SOCKS | REALLY RED 6-12M | 4831622715505 |
| T | 31 | 1PR CI SOCKS | REALLY RED 12-24M | 4831622715512 |
| W | 31 | 1PR CI SOCKS | REALLY RED 2-3YRS | 4831622715542 |
| B | 41 | 1PR CI SOCKS | BRIT YELLOW 0-6M | 4831622715563 |
| E | 41 | 1PR CI SOCKS | BRIT YELLOW 0-6M | 4831622715587 |
| H | 41 | 1PR CI SOCKS | BRIT YELLOW 6-12M | 4831622715614 |
| Continue next page | | | | |

FIG 1A

Retailer Planogram Layout

| DISPLAY # | DISPLAY TYPE | ASSORTED MERCHANDISE | |
|---|---|---|---|
| | DISPLAY SIZE: 24X48 | SET DATE: | 12/10/2011 |

| Location | Fixture UPC | Product UPC | Description |
|---|---|---|---|
| A1 | 06128987421 3 # 04310075214 1 | | Security Envelopes |
| I1 | 06128987421 3 # 04310075212 7 | | Mead Envelopes |
| N1 | 06128987421 3 # 04310075212 7 | | Kraft Velveeta |
| H13 | 06128456324 8 # 06848804921 8 | | Stick Pen Black |
| M13 | 06128456894 1 # 06848804922 5 | | Stick Pen Blue |
| P16 | 06128456324 8 # 07667020751 3 | | Expressions Paint Brush |
| R16 | 06128456324 8 # 07667020751 3 | | Expressions Paint Brush |
| U16 | 06128456324 8 # 88411805557 8 | | Plastic Candle Light |
| C20 | 06128458491 2 # 01634630115 2 | | Spatulas |
| H20 | 06128456324 8 # 60325003810 8 | | Jumbo 8CT Crayons |
| L20 | 06128456324 8 # 60325003810 8 | | Jumbo 8CT Crayons |
| H26 | 06128456324 8 # 60325003633 3 | | 24 CT Crayons |
| L26 | 06128456324 8 # 60325003633 3 | | 24 CT Crayons |
| P33 | 06128456324 8 # 72432892018 4 | | Jumbo Highlighter |
| U33 | 06128456324 8 # 88411805557 8 | | Plastic Candle Light 5 IN |
| H34 | 06128456894 1 # 07198000026 7 | | Ruban Tape 3/4 inch wide |
| L34 | 06128456894 1 # 07198000026 7 | | Ruban Tape 3/4 inch wide |
| B35 | 06128458491 2 # 04867699026 3 | | Utility Knife |
| E35 | 06128456324 8 # 04867699026 3 | | Utility Knife |
| H40 | 06128456894 1 # 07198039202 7 | | Transparent Tape 3.472 SF |
| L40 | 06128456894 1 # 07198039202 7 | | Transparent Tape 3.472 SF |
| B47 | 06128456894 1 # 04867699027 0 | | Paring Knife |
| E47 | 06128456894 1 # 04867699027 0 | | Paring Knife |
| I47 | 06128456324 8 # 88411805557 8 | | Plastic Candle Light 5 IN |
| O47 | 06128456894 1 # 40022016567 9 | | Santa Blinking Stake |
| U47 | 06128456894 1 # 40022016567 9 | | Santa Blinking Stake |

FIG 1B

PROJECTED IMAGE PLANOGRAM SYSTEM

RELATED APPLICATION

This application is a continuation-in-part of U.S. patent application Ser. No. 13/674,627 filed Nov. 12, 2012, which claims benefit of U.S. Provisional Patent Application No. 61/558,834, filed Nov. 11, 2011 and U.S. Provisional Patent Application No. 61/680,576, filed Aug. 7, 2012, which applications are hereby incorporated by reference herein in their entirety.

TECHNICAL FIELD

The invention relates generally to retail displays, and more particularly, to planograms used in displaying merchandise in a retail display.

BACKGROUND

The retail industry uses a process called planogramming for creating and communicating the design of a merchandise layout within a given category to be replicated at multiple retail locations. Typically created by corporate management or other centralized decision-makers, a planogram is an illustration, drawing, or instructions showing where products should be placed on pegboard or other display background surfaces. It also details what fixtures, shelves, hooks, or other product display holding equivalents are used for displaying these products.

Retailers use planogramming to direct and influence consumers' purchases by creating merchandise displays that are well organized and visually appealing. The goal of planogramming is to increase sales and profits. Planogramming both improves the customer's shopping experience and influences customer behavior to encourage trade-up and impulse purchases. For retail corporate management, the planogram is utilized as an information conveyance tool with the goal of ensuring that merchandise in their retail locations is set for display exactly as planned at the corporate headquarters. For employees in these retail locations, the planogram is used as a specific instruction for setting up the merchandise displays.

Planogramming is one of the more costly payroll functions in retail. Planograms are typically created at the corporate level, usually in corporate planogram rooms, by highly paid Senior Buyers, Corporate Planners, Divisional and Senior V.P.s. Their time is invested to make sure every item in their stores is displayed in a manner that maximizes its sales potential. Management undertakes this expensive enterprise with the expectation that the optimal merchandise display they approved will be replicated in each of their stores exactly as created in their corporate headquarters.

In current practice, once the planogram is approved by management, a UPC code is attached to each merchandise item displayed. These UPC codes are then scanned using a hand held bar code reader to record the merchandise in the planogram. Next, peg holes are counted to establish the placement of fixtures and merchandise within the display pegboard and reflected in the planogram. This information is detailed in a paper document of the planogram, which is then distributed to stores for implementation. FIGS. 1A and 1B depict the traditional paper planograms received by individual retail stores.

Store employees use the paper planogram document to physically set the merchandise display. These merchandise displays are typically set when stores are closed, by hourly employees working late into the night, using methods that typically involve manually counting peg holes to determine fixture and merchandise placement, in an effort to recreate the planogram layout determined by corporate. Thus, display setting using traditional paper planograms is time-consuming and costly.

Further, the existing process used by retailers for setting planograms leaves much room for error in recreating the merchandise display in the store. An error in the placement of one fixture when setting the planogram can make the entire planogram incorrect. Many times this error is not realized until the employee is near the end of setting the planogram, at which time the employee discovers that merchandise to be displayed will not fit in the available area remaining. To correct the error, the employee must strip merchandise and fixtures already set and reset them in their proper locations. This setting and re-setting of the planogram adds additional time, increasing labor costs for the retailer.

Therefore, there is a need for an efficient, precise system for setting fixtures and merchandise in retail locations based on planograms that are set in a location other than the retail location.

SUMMARY

Embodiments of the present application substantially meet the aforementioned needs of the industry. In an embodiment, the Projected Image Planogram System (hereinafter "PIPS" or "PIP" system) is an automated display planning and implementation system used in planogramming.

In an embodiment, the Projected Image Planogram system uses a camera, projector, marker code reader, illuminated images and a specialized computer program to store planograms as designed, communicate these planograms to retail locations, and provide an easy to use system insuring that the planograms are recreated or installed as originally conceived.

By accessing readable or other scannable marker codes assigned by retailers, manufacturers, or planogram creators for each fixture and corresponding merchandise attached to that fixture within the planogram, which include, but are not limited to readable codes such as barcodes, including 2D or 3D barcodes, matrix codes, such as QR codes or 2D matrix codes in general, 3D matrix codes, UPC codes, DPCI codes, PDF 417, EAN, Aztec, Data Matrix, Codabar, or other readable marker code, the PIP system combines the readable code data identifying the fixture and the merchandise item to create and generate a unique marker code. The marker code includes data identifying the fixture ("fixture identifier") and the merchandise item (merchandise identifier). Herein, "fixture identifier" refers to readable code, such as a marker code, or other means of identifying a particular fixture. Similarly, "merchandise identifier" refers to readable code, such as a marker code, or other means of identifying a particular merchandise item. The unique scannable and readable marker code is used for storing and communicating fixture and merchandise data information, as well as the fixture and merchandise placement locations within the planogram. In an embodiment, an image of the completed planogram, as well as images of the locations for both fixture and merchandise is taken at the corporate planogram room where the planogram is designed. At store locations the PIP system is used to re-create the planogram exactly as designed by corporate. This may be done in three ways: 1) by projecting the image of the finished planogram on the display board being set and 2) by identifying merchandise and fixtures displayed on the planogram by using a reader, such as a marker code reader, or by accessing other database(s) interfaced with the PIP system 3) by illuminating the exact location within the planogram where fixtures and merchandise are set.

Embodiments of the PIP system provide a more accurate method for recording and conveying the corporate planogram design to their retail stores. In the stores, this system facilitates a more efficient, less expensive and more accurate installation of the planogram. This PIP planogram system reduces the risk of misinterpretation and human error, assuring an exact duplication of the corporate planogram design in every store location where the planogram is set.

In embodiments, at the planogram planning site a planogram is physically, for example set in a corporate planogram room. Often, the physical and manual setup of a planogram provides executives a thorough look at the proffered display, as it can be seen by the planners as it will be seen by customers. Once the planogram is physically set, a photographic image is recorded of that completed planogram. The readable marker codes for each item of merchandise and the fixture on which that merchandise is displayed (peg hook, shelf, divider, hanger, etc.) respectively, can then be scanned and merged together by the PIP system and its computer program to create a unique marker code. Each unique marker code incorporates readable marker code data on the item of merchandise displayed and its corresponding fixture. A readable version of both the merchandise and fixture readable marker code is embedded in the unique marker code to aid in planogram set up at store locations and for inventory tracking purposes.

In an embodiment, a unique marker code label is attached to the display board directly above the display board holes on which the fixture is mounted. The fixture and its corresponding item of merchandise are then removed from the display board. In a planogram with a shelf displaying multiple items of merchandise a similar procedure is used for attaching marker codes labels, stickers and so on. The unique marker code sticker for each item of merchandise, which also identifies the shelf, is attached to the display board directly above the shelf at the location where that merchandise item is displayed. After all the unique marker codes for the merchandise displayed on the shelf have been attached, the shelf is removed.

The above-described procedure for reading merchandise and fixture data, creating and attaching unique marker code labels, and removing merchandise and fixtures from the planogram is repeated for each item of merchandise displayed and its corresponding fixture until all merchandise and fixtures have been removed from the display board and only the unique marker codes remain.

In an embodiment, marker code data is collected by using a digital camera to photograph each display board section of the planogram with only the unique marker codes attached. The photograph is sent to the PIP system computer which stores the merchandise and fixture data and the specific location information for the display of that merchandise and corresponding fixture within the planogram.

To ensure accuracy in future projections of the planogram in retail stores, after the planogram fixture and merchandise marker code information is stored in the PIP system, the planogram can be projected back on to the display board to confirm that the projected positions of the beams of light for all fixtures and merchandise lines up with the locations of the corresponding marker codes. In an embodiment, any projected position that does not line up with the location of the corresponding marker code may be manually adjusted or moved within the PIP system to correct the alignment of the relative locations. After these corrections are made, the planogram is then finalized in the PIP system and is ready to be sent to the stores.

This manual entry feature for marker codes adds flexibility and usability to the PIP system. This function can be used to confirm marker codes retrieved by the camera or to change a marker code after the planogram has been photographed or imaged and finalized in the planogram room. The manual entry feature also accommodates differences in camera lens distortion or quality of camera. The manual feature for entering marker codes can also be used to construct an entire planogram without the use of a camera, as is described below.

In another embodiment, the planogram is not created manually at a physical planogram planning site, but is instead created virtually. Planning professionals can individually or collaboratively use system software to create customized planograms. Layouts of any desired merchandising display can thereby be virtually created, thus applying the aforementioned steps of manually setting up the planogram to a virtual environment. This may be via collaboration online or via a networked system or individually by a particular planner at a single or combination of system terminal(s).

In an embodiment, each item of merchandise and the fixture on which that merchandise is displayed (peg hook, shelf, divider, hanger, etc.) can be virtually accessed or selected and subsequently virtually manipulated to be in a desired position. Once the planogram is virtually defined, a virtual image is recorded of that completed planogram. As the details of each item of merchandise and the fixtures on which the merchandise is displayed will be known or accessible by the system, the PIP system can merge the respective data to create a virtual marker coding. In an embodiment, the output of the virtual planogram is equivalent to the imaged physical planogram display, having readable marker codes for each item of merchandise and fixturing, which can then be merged to create a unique marker code for the merchandise and fixture. In another embodiment, the virtual planogram output has only unique marker codes, thereby skipping the step of merging the readable marker codes for each item of merchandise and fixturing.

In an embodiment, each unique marker code, just as in the physical planogram implementation embodiment, incorporates all readable marker code data on the item of merchandise displayed and its corresponding fixture. A readable version of both the merchandise and fixture readable marker code may be embedded in the marker code to aid in planogram set up at store locations and for inventory tracking purposes. The unique marker code label is then virtually attached to the planogram image output directly above the virtual display board holes on which the virtual fixture is mounted. In embodiments, the output can be simply the display image, properly encoded with marker codes, or can also incorporate fixturing and/or portions of merchandise, as selected by the user. Just as in the physical setup embodiment, the image of the planogram is generated and is dimensionally correct relative to the display base.

In another embodiment, the system accepts as an input a planogram image, or image data, or other suitable planogram file created outside of the PIP system. In such an embodiment, the inputted planogram image or other planogram file can be created by any number of commercially-available planogramming software products or other virtual applications or web-based interfaces. Once the planogram image is input, the PIP system uses image-recognition algorithms to identify fixtures and merchandise within the image. In another embodiment, the inputted image can contain identifying marker code data to identify each fixture and piece of merchandise within the planogram. Other suitable identifying procedures or algorithms are also contemplated. Each fixture and piece of merchandise is then identified and a unique marker code for the merchandise and supporting fixture can then be generated.

From the corporate headquarters, or virtual environment location, as appropriate, the planogram is electronically sent to the stores where the planogram is to be set. Physical delivery of an electronic copy of the planogram is also possible. For example, a flash drive, writable disc (CD, DVD, etc.), portable hard drive, or any other storage means can comprise the planogram data and likewise be delivered to individual stores. In another embodiment, the planogram may be stored on a centralized computer, such as a server, database server, or other such centralized computer or storage device, which is then accessed by individual stores to retrieve the planogram.

At the stores, software for the PIP system, including planogram data files, may be loaded into a computing device, such as a computer, laptop computer, notebook, notepad, smartphone, and so on, with a marker code reader attached (such as a UPC bar code reader or other suitable scanner, reader or capture device), and a short throw projector, which is placed in the store aisle in front of the display board where the planogram is to be set.

In embodiments, at the store site, the first step in using the PIP system is to set the calibration of the projector with the display board. Once the display board is completely covered with projected light from the projector, calibration is performed by clicking on the four outermost peg holes on the display board section using a mouse and cursor. Other appropriate calibration methods are also considered.

Once calibrated, store employees can optionally project a full-size photographic image of the completed planogram as created at corporate on their store display board, showing what the planogram will look like when finished.

Next, fixtures are attached to the display board. The PIP system projects beams of light identifying on the display board the location at which the fixtures used in the planogram are to be placed. In an embodiment, this is done via a store employee scanning the code of the various fixtures using a readable marker code reader, such as, but not limited to, scanning a marker code using a marker code reader. The fixture location is then indicated on the display board, such as by projecting a beam of light, such as a colored beam of light, onto the display board or fixture support structure. Store employees then attach the fixtures used in the planogram at their indicated or identified locations. For fixtures not included in the specific display, no location illumination is provided.

Once all fixtures have been physically attached to the display board, store employees then set the merchandise on the planogram. In an embodiment, using a readable marker code reader similar to the fixture setting described above, a store employee can scan the readable marker code on an item of merchandise. The PIP system uses this readable marker code scan to identify that item of merchandise and the location within the planogram where that item is to be displayed. This location is indicated on the display board, such as by a projected beam of light, such as a colored beam of light. The item of merchandise is then physically set on the appropriate corresponding fixture on the display board. This process is repeated until all merchandise items have been identified and placed on the display board at their appropriate location. Further, similar to the fixture setting described above, for merchandise not included in the specific display, no location illumination is provided. In a feature and advantage of embodiments of the invention, a method of recording a planogram or display model or wall display as designed or established in a planning location is described. In embodiments, the planogram or display or design is recorded by use of a digital camera or similar recording device. Embodiments can be utilized not just in the retail store context, but in all applications wherein a design is established in one location and is recreated in another or in multiple other locations.

In another feature and advantage of embodiments of the invention, product or merchandise identification and fixture identification can be established by reading readable marker codes on the product and fixture by the use of a marker code scanner or other equivalent, or by assessing data bases containing product and fixture information.

In another feature and advantage of embodiments of the invention, embodiments merge readable marker code data such as UPC bar code data or equivalents obtained from scanning or accessing other databases to produce a printed or virtual marker code which incorporates both the merchandise information and the fixturing on which said merchandise is displayed. In embodiments, marker codes can be printed by use of a marker code printer, a computer printer or other equivalent device. Marker codes can be attached to the display board, being placed at appropriate locations to identify merchandise and fixture set at such locations. Likewise, marker codes can be virtually attached to the proper location within a virtual planogram image.

In another feature and advantage of embodiments of the invention, locations of merchandise and fixtures within the planogram or display section are recorded by use of a digital camera or other similar or equivalent method of recording marker code information and storing it for later use.

In another feature and advantage of embodiments of the invention, the planogram is created virtually within the PIP system. Planning professionals can individually or collaboratively use system software to create customized planograms, equivalent to designs by manual planograms, that can subsequently be displayed at the retail store.

In another feature and advantage of embodiments of the invention, the system accepts as an input a planogram image created outside of the PIP system. The PIP system uses image recognition algorithms to identify fixtures and merchandise within the image.

In another feature and advantage of embodiments of the invention, the information and images recorded are sent to other locations for recreation.

In another feature and advantage of embodiments of the invention, at the retail store or other environment where the planogram or design is to be set or recreated, a computer with projector attached displays aspects of the planogram or design on the display board or the display surface area. In embodiments, the display can include: an image of the completed planogram or design, illuminated shapes or images identifying fixture type, illuminated shapes or images identifying fixture locations, illuminated shapes or images identifying merchandise to be displayed, illuminated shapes or images identifying merchandise locations, and illuminated shapes or images identifying other items used or incorporated within the design. The illuminated shapes or images may incorporate the use of numerous colors, shapes, designs, textures, photographic images or other equivalents for delineation or identification.

In another feature and advantage of embodiments of the invention, illuminated images are highlighted on the display board, wall or on any other display surface where a design is being recreated. Specific image locations are identified by use of a marker code reader or similar device, or by accessing corporate or other auxiliary databases, or by other means that accesses readable marker code data to identify merchandise, fixturing, or other items used in the design or planogram. The invention identifies and illuminates the exact location where that merchandise, fixture or other item used is to be set within the planogram or design.

In another feature and advantage of embodiments of the invention, in retail store applications embodiments allow for the setting of fixtures and merchandise within a planogram when constructed at store level to be an exact replication of the original planogram as conceived, designed and approved by senior management in the corporate location.

In another feature and advantage of embodiments of the invention a synchronized multiplicationary application is provided so that when an area of display is composed of multiple sections, embodiments can be incorporated into one planogram using multiple projectors linked to a computing device with a marker code reader attached. Multiple sections can be incorporated in to the PIP system after pictures of each section are taken with a digital camera.

In an embodiment of the invention, a projector connected to a computing device provides a set-up image directly on a store, display board thereby providing store personnel a visual image for stocking product on the fixture. In an embodiment of the invention, the computing device calibrates the set-up image for the display board, thereby presenting a location template as an image projected on the display board. In an embodiment of the invention, alignment positions are provided on the display board, such as corners or markings on the display board which are utilized to position the image and/or for calibration.

In an embodiment of the invention, a portable projector on a stand projects a merchandise stocking template directly on a store display board to be stocked or set up. In an embodiment of the invention, store personnel attach fixtures (hooks, shelves, bins, etc.) positioned by way of reference to the images cast directly on a store display board by a projector. In an embodiment of the invention, a projector casts a still image on a display board showing fixture locations. In an embodiment of the invention, a projector casts a still image showing merchandise stocking locations on the display board.

In an embodiment of the invention, store personnel stock merchandise directly on a store display board in accord with an image projected on the store display board illustrating merchandise placement.

In an embodiment of the invention, a transitory image is projected on a store display board providing location information for fixture and/or merchandise placement. In an embodiment of the invention, the images projected on a store display board have transitory location designations for fixtures and/or merchandise.

In an embodiment, the present invention provides a method of combining a fixture marker code and a merchandise code to create a combined marker code for efficient, streamlined processing. The method comprises accessing a fixture marker code database, the fixture marker code database containing individual fixture data, accessing a merchandise marker code database, the merchandise marker code database containing individual merchandise data, and generating a combined marker code, the combined marker code which includes the individual fixture data and individual merchandise data.

In an embodiment, the present invention provides a method of processing individual combined marker codes within an image containing a plurality of combined marker codes, the method comprising receiving a real-world size of the image as taken on a physical space, receiving an image containing a plurality of combined marker codes, decoding each of the plurality of combined marker codes to obtain a location and size of each of the plurality of combined marker codes, converting the location and size of each of the plurality of combined marker codes to real-world location and size based on the received size of the physical space.

In an embodiment, the present invention provides a method of relating a virtual image to a physical space having known dimensions, the method comprises calibrating an image capturing device, capturing an image, relating the calibration to the image, and determining the relative locations of items in the image with respect to the physical space by applying the image to the dimensions of the physical space.

In an embodiment, the present invention provides a method of projecting an image of a first location at a second location via a projector, the method comprising capturing a calibrated image of a first location by an image capture device, calibrating the projector by selecting each of the four corners of the second location, relating the four corners to the image by estimating a homographic perspective transformation from physical units of the second location to pixels of the projector, and converting pixels of the image capture device to pixels of the projector. In an embodiment, the dimensions of the first location are different from the dimensions of the second location. In an embodiment, the calibrated image includes estimating a homographic perspective transformation from physical units of the first location to pixels of the projector.

In an embodiment, the present invention provides a method of indicating or highlighting a location on a projected image, the method comprises scanning a marker code of an item, searching a planogram file for the scanned item, reading from an item database, the size of the item, converting image pixels to projector pixels with respect to the size of the item to create a converted shape, and projecting the converted shape. In embodiments, the item database can be a fixture database. In embodiments, the item database can be a merchandise database. In embodiments, the projected converted shape can be colored, textured, photographic images or other equivalents.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1A and 1B are illustrations of traditional paper planograms generated by corporate display planners and received by individual retail stores.

Figure 2A:
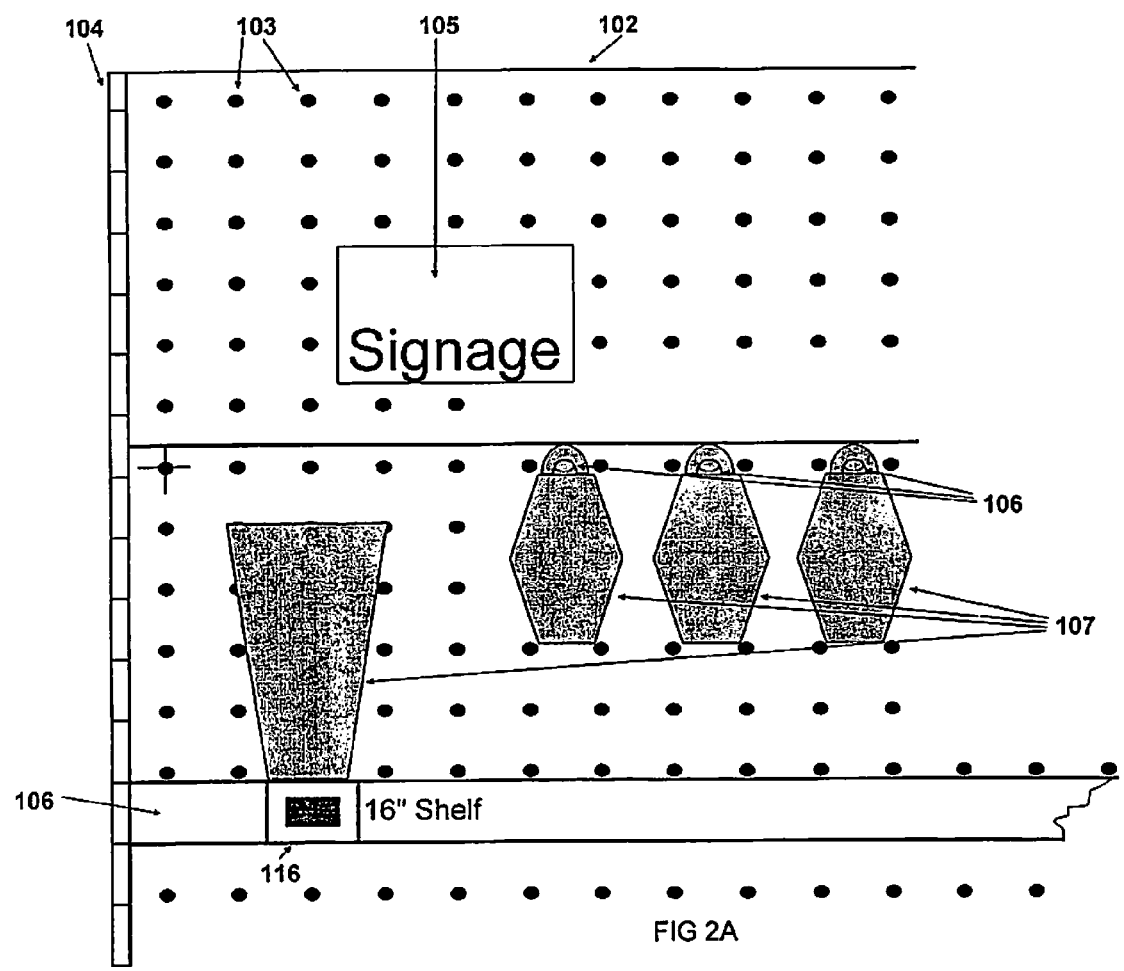
FIG. 2A is an illustration of a section of a planogram with merchandise and fixtures set in the corporate planogram room, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Representations of current methods for recording and distributing planogram information are shown in FIGS. 1A and 1B. Product layout for the planogram are depicted in a drawing showing specific fixture and merchandise locations along with written detail on the fixture and product used in the planogram.

Figure 2B:
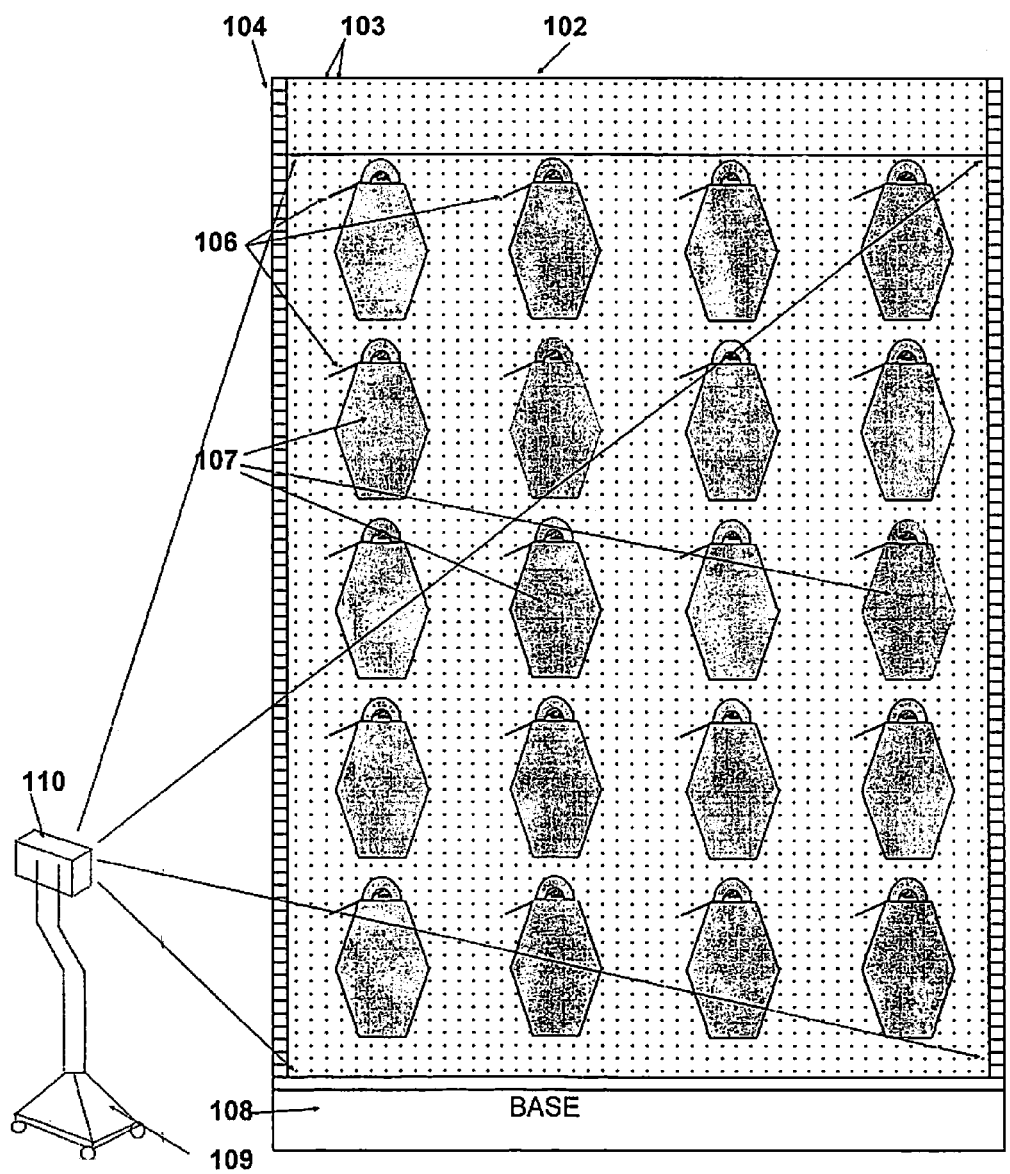
FIG. 2B is an illustration of a camera taking a photo image of the planogram with merchandise and fixtures set, according to an embodiment.

A more detailed description of the various embodiments of the present invention is provided with further references in the drawings beginning with FIG. 2A, a depiction of a store display section 102 or merchandise display structure, which in an embodiment comprises a display board with holes having the usual alignment of 1" spacing both vertical and horizontal 103 with a metal stanchion 104. Store display section or merchandise display structure 102 includes various known merchandise display structures, display devices, systems and structures for supporting fixtures and displaying merchandise. Optional store signage 105 for marketing is attached across the top of the display board 102. Embodiments show fixtures 106 for displaying merchandise including a metal shelf 106 and peg hooks 106 with merchandise items 107 displayed on the shelf 106 and hanging merchandise 107. FIG. 2B depicts the display framework base 108 and a digital camera 110 used to photograph the various aspects of the planogram as set in the corporate planogram room including the merchandise 107 hanging on the display board 102 via fixture hooks 106 inserted into display board holes 103. Camera 110 also records an image of the completed planogram as physically set in the corporate planogram room. Optionally, camera 110 is held stationary during photographing by the use of an adjustable stand 109.

Figure 3:
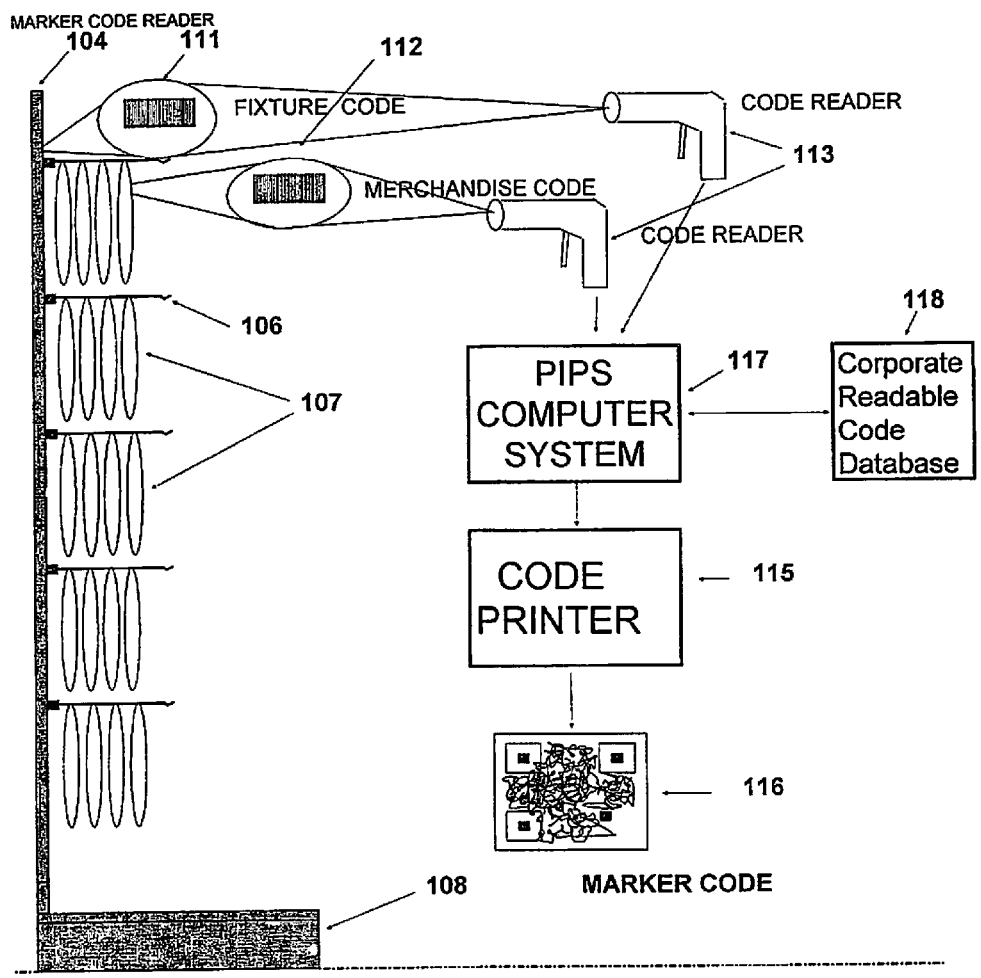
FIG. 3 is an illustration of a marker code creation step showing fixture and merchandise codes scanned by a marker code reader, with a marker code creation device to output a peelable adhesive-backed marker code suitable for attachment to display board display at appropriate locations, according to an embodiment.

Referring now to FIG. 3 the display base 108 supports the stanchion 104 holding the display board 102 (not shown in this side view) in place for the display of merchandise 107 on fixtures such as display board hooks 106. Fixture readable marker identifiers 111, which may comprise readable marker codes, may be embedded in the fixture by a manufacturer or attached to fixtures in a planogram room or accessed from the corporate fixture data base, or otherwise provided. Merchandise identifiers 112, such as readable merchandise marker codes 112, created by a manufacturer or retailer or other entity, are affixed to the merchandise displayed, or accessed from the corporate merchandise data base, or are otherwise acquired.

In an embodiment, a reader or scanner such as handheld marker code reader 113 first reads a fixture readable marker code 111 then reads a merchandise readable marker code 112. IN an alternate embodiment, fixture identifier and merchandise identifiers are enter into to the system using other methods besides scanning, such as manual data entry, selection from a list on a computer, and so on. In an embodiment, each scanned, or otherwise entered or acquired, pair of fixture and merchandise identifiers or readable marker codes are identified in the PIP system by accessing a database, such as the retailer's corporate database, to retrieve readable marker code information for that fixture and merchandise pair. In an embodiment, corporate data may be uploaded to the PIP system or may be obtained from other data sources. For each pair of merchandise and fixture identifiers, the PIP system computer program 117 creates a unique marker code 116, which, in an embodiment, can be printed with an adhesive back by a marker code printer 115. In other embodiments, fixture and merchandise data may be acquired using other methods and devices. Such embodiments include entering fixture and merchandise data into a database on site or remotely (virtually). Scanners or readers used may include 2D scanners, laser scanners, and so on, in addition to marker code readers.

Figure 4:
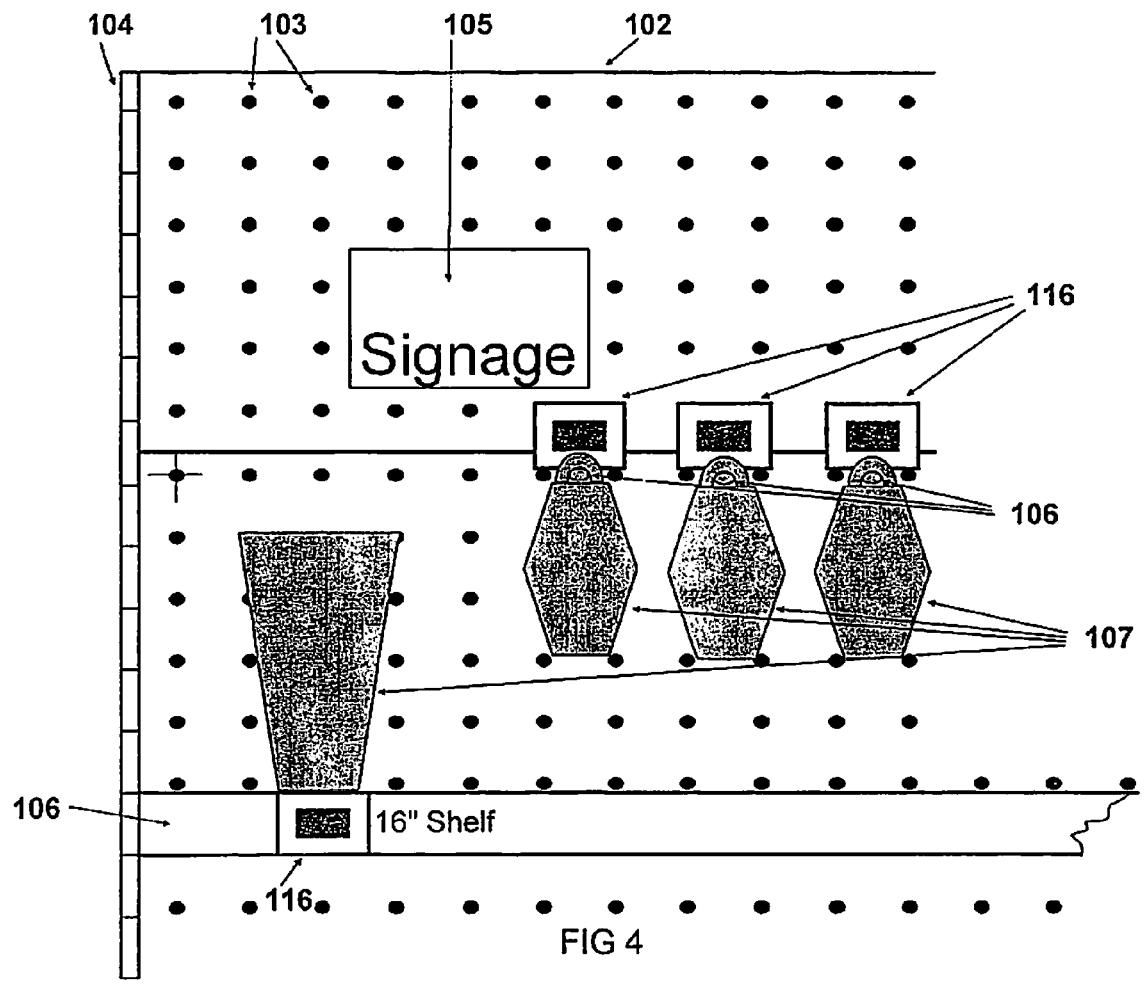
FIG. 4 is an illustration of a planogram with fixtures installed, merchandise displayed, and marker codes appropriately attached, according to an embodiment.

In the embodiment depicted in FIG. 4, printed adhesive backed marker codes 116 are attached to the display board 102 of the merchandise display structure immediately above the peg holes 103 holding a peg hook fixture 106 on which merchandise 107 is displayed and on the display board 102 immediately above the top edge of a shelf fixture 106 on which the merchandise 107 is stacked or arranged for display.

Figure 5:
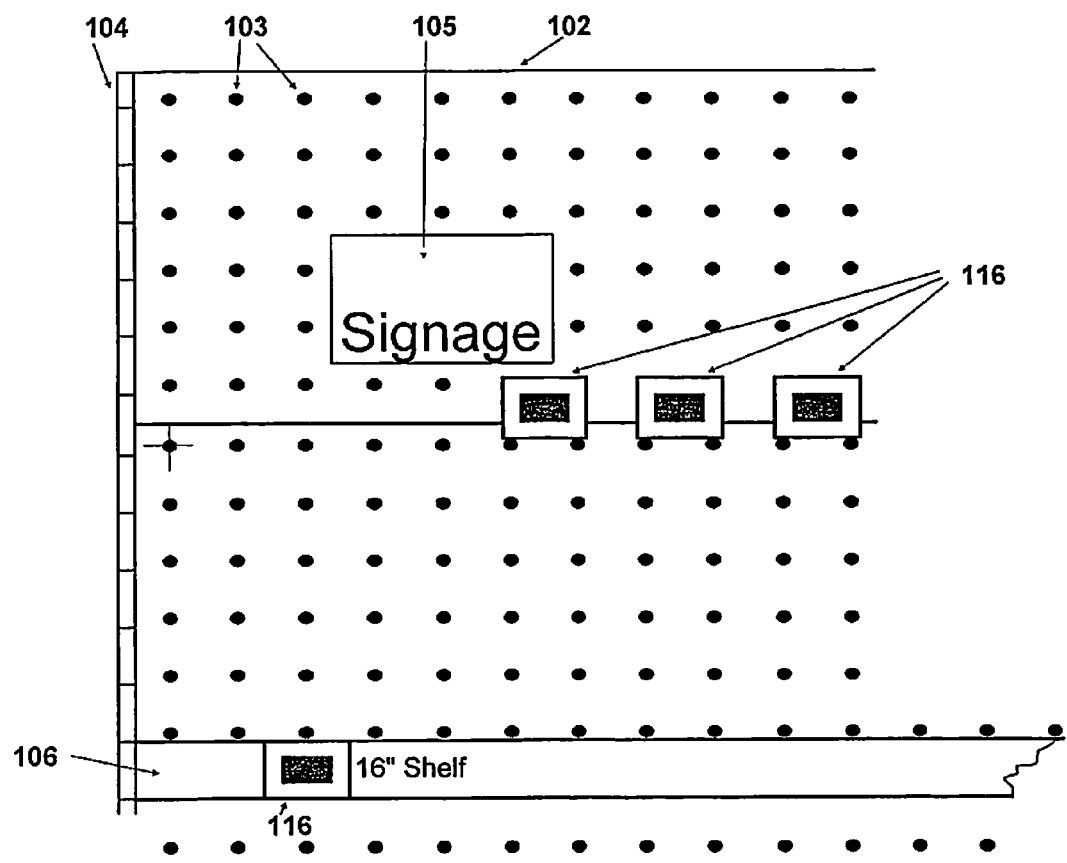
FIG. 5 is an illustration of a planogram with only marker code labels attached, according to an embodiment.

In FIG. 5, once the marker codes 116 are affixed to the display board 102 at their appropriate locations the merchandise 107 and fixture 106 are removed from the set planogram.

Figure 6:
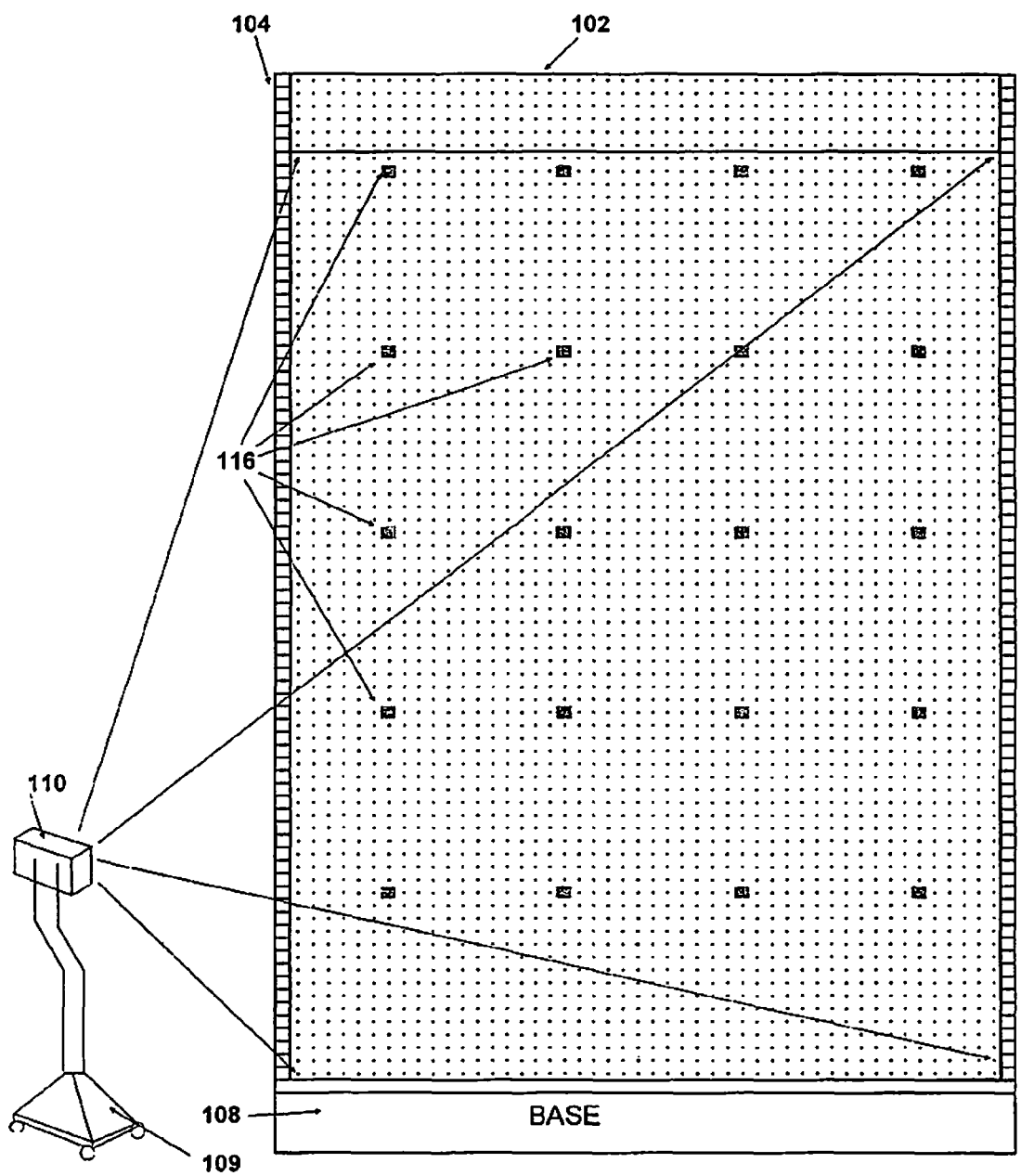
FIG. 6 is an illustration of a camera collecting a photo image of a planogram with only the marker code labels attached, according to an embodiment.

FIG. 6 depicts capturing an image of marker codes 116 displayed on merchandise display structure 102. More specifically, FIG. 6 depicts a digital camera 110 recording in a photographic manner the marker codes 116. In an embodiment, a single digital image can capture all marker codes 116. In other embodiments, a series of digital images are taken via digital camera 110, where each image depicts a portion of the entire display or display board 102, for example. The series of images can subsequently be laced or stitched or overlaid together to capture all of the marker codes of the display.

Figure 7A:
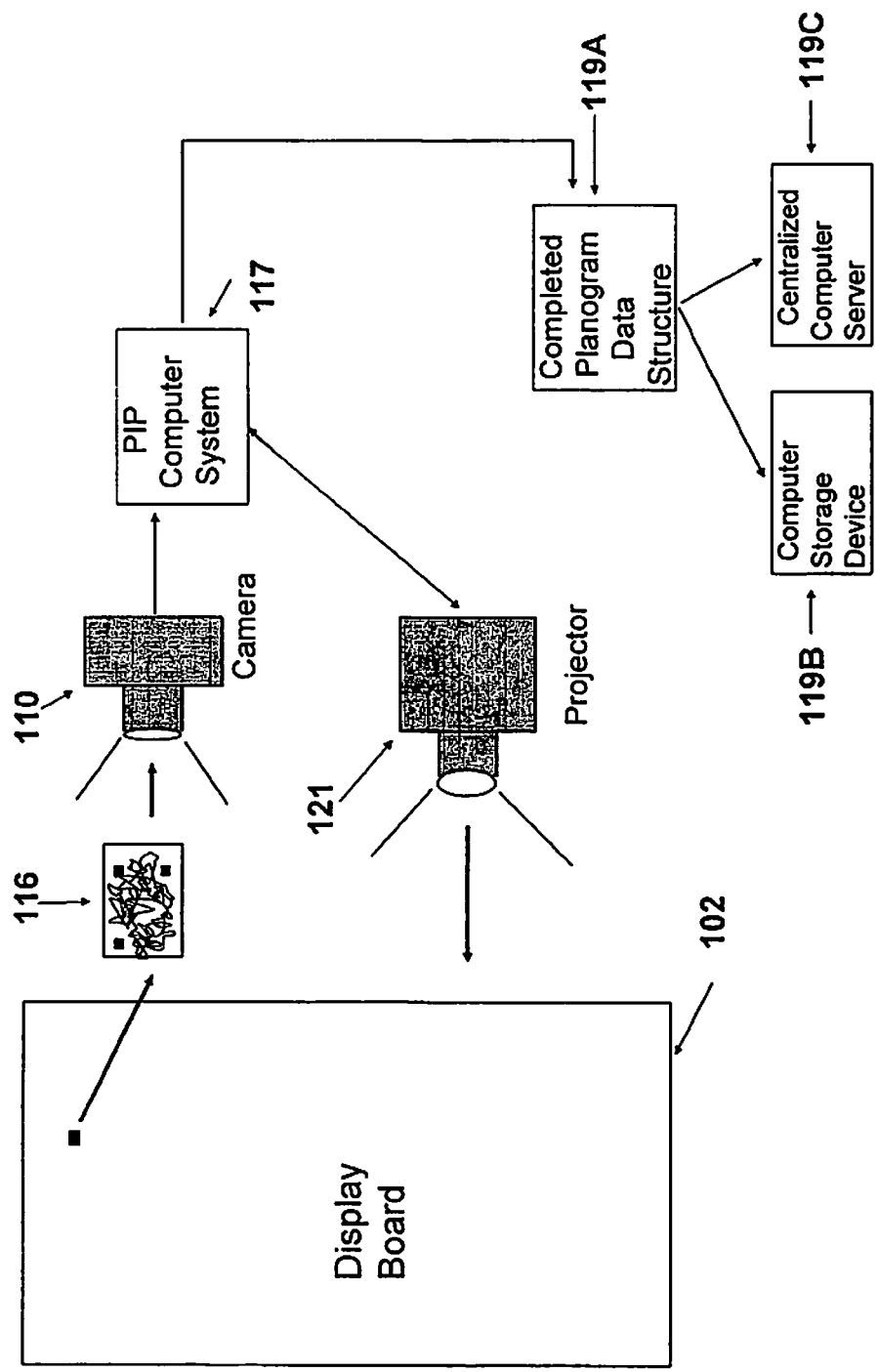
FIG. 7A is an illustration of data collection and data combination processes according to embodiments of the passage of information collected by the camera as photo images of the marker codes and the fully set planogram of FIG. 2A, according to an embodiment.

Referring to FIG. 7A, a photographed image of the set planogram with marker codes 116 is sent to the PIP system computer program 117 via camera 110. Once the PIP system computer program 117 receives the photographed image of the marker codes in the set planogram and all other algorithms have been completed, a recorded planogram is created. In an embodiment, the planogram, as recorded, can then be checked by projecting one or more images, portions of images, or other indicators, such as projecting beams of light highlighting marker code locations back on to the display board 102 on which the physical planogram was originally set, with the marker codes still attached. Within this projection, each individual beam of light corresponds to a set marker code location. If any of the projected beams of light do not align to their corresponding marker code locations a Manual Adjustment Feature in the PIP system computer program 117 may be used to correct the misalignment. This adjustment can be made within the PIP system computer program 117, by use of a mouse or keystroke.

Once all marker code locations are aligned, the completed PIP system planogram program 119A is finalized and sent to a storage device 119B and/or centralized computer server 119C. This Manual Adjustment Feature makes it possible to make individual marker code changes, during or after the Planogram has been completed (i.e. change of merchandise color, etc.).

Figure 7B:
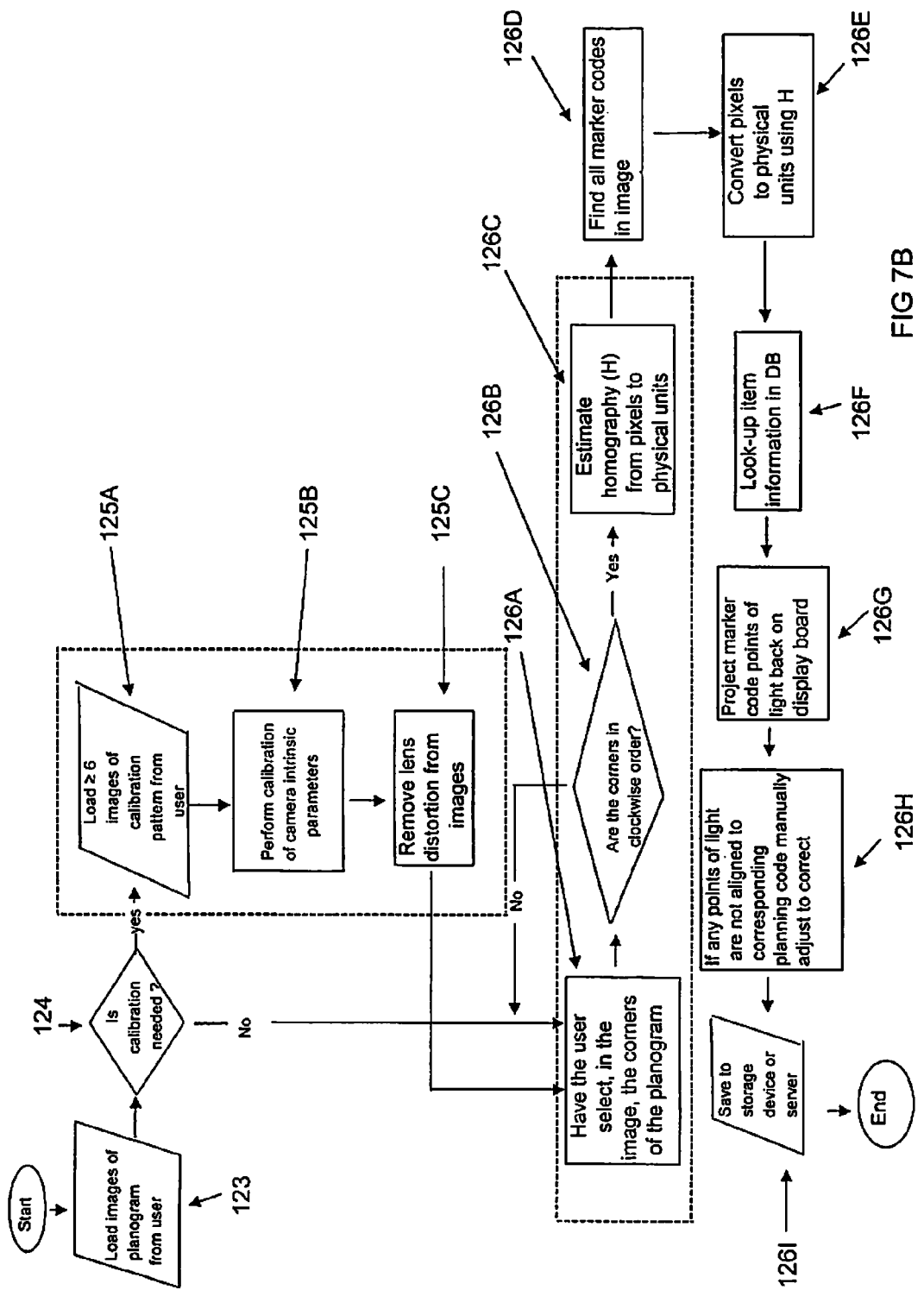
FIG. 7B is a flowchart of an algorithm of the PIP system used at the centralized, corporate location, according to an embodiment.

The flowchart of FIG. 7B illustrates an embodiment of an algorithm of the PIP system computer program 117 used in the corporate planogram room and details the process shown at FIG. 7A. In embodiments, PIP system computer program 117 software may use any of a variety of libraries to implement various computer vision algorithms, including open-source computer vision libraries, such as OpenCV, ZXing and Zbar, though it will be understood that the invention is not limited to any particular computer vision, imaging or decoding library. In embodiments, database implementation can be by Debea, SQLite, or other such libraries.

Referring to FIG. 7B, at step 123, images of the planogram are loaded into the PIP system for projection onto the planogram room display board 102 for review and assurance that all marker codes are captured. If calibration is needed, at step 124, images of a calibration pattern are loaded into the PIP system computer program 117 at step 125A, and calibration of the camera's intrinsic parameters is performed at step 125B. In an embodiment, lens distortion is then removed at step 125C. In an embodiment, this is done by analyzing several images of a checkerboard pattern using an imaging library, such as an OpenCV library. In an embodiment, this is, at its core, a non-linear least squares optimization, which in the end gives the camera focal length and more importantly the parameters of any radial or tangential distortion present in the lens. Upon completing steps 125A, 125B and 125C, when the image or images of the full planogram and the planogram display board with just the marker codes are presented, the radial and tangential distortion can be removed since the parameters have been calibrated. This allows treatment of the images as if the images were taken with a perfect pinhole camera.

The loaded images are checked to ensure that the entire planogram image has been captured, including the corners, at step 126A. In an embodiment, a check may be done to assure that all four corners have been captured because, they are used for calibration at step 126B. In an embodiment, since the camera is now assumed to be a perfect pin-hole camera, by selecting the four corners, a homographic perspective transformation at step 126C can be defined from the image into a common space defined by the size of the planogram (which was entered in an embodiment, in inches). In practical results this creates a rectangular image that exactly matches the dimensions of the planogram from the input image, even if in the input the planogram is a parallelogram because the image was taken at an angle.

The information embedded in the marker codes 116, which includes readable marker codes for fixtures 111 and merchandise 112 and other fixture and merchandise information, is read at step 126D and within the PIP system by a system processor, the marker code locations are transformed from pixels to physical units at step 126E. In an embodiment, now that a rectangular image has been defined with radial, tangential, and any keystoning/parallelogramming removed, it is passed on to the decoding library, which may be a ZXing library, which decodes the marker codes in the image.

In an embodiment, the image is passed on to an imaging library such as a ZBar library for decoding. As is known in the art, ZBar algorithms make linear scan passes over an image, treating each pixel as a sample from a single light sensor. The data is scanned, decoded and assembled on the fly. ZBar further abstracts this idea into a layered streaming model. Other imaging libraries or sets of algorithms can also be utilized. In another embodiment, two or more libraries are utilized, such as the ZBar library in combination with the ZXing image library, to find marker codes in the image. In embodiments, depending on the image, by utilizing algorithms from each library in combination, a higher percentage of marker codes can be found.

Returned to the PIP system computer program 117 are the location and size of the marker codes within the image (which can be easily converted into physical world units such as inches since the image has been rectified using the four corner selection) as well as the data contained within the code. The data within the marker code is used to look up the item in the database, and if the item data is valid, it is saved into the output planogram, which in an embodiment comprises a data structure which can be saved to a storage device 119B or centralized computer server 119C. Effectively, then, the PIP system computer system and program 117 receives or pulls information from the corporate-readable marker code database 118 or other connected databases 126F. The readable marker code data obtained interfaces with the marker code 116 data within the PIPS computer program 117 to identify locations for merchandise and fixtures within the planogram. The planogram can be projected back on the display board (with marker codes still attached) at step 126G. If any of the projected beams of light do not align to their corresponding marker code locations a Manual Adjustment Feature in the PIP system computer program 117 is used to correct the misalignment at step 126H. Once all marker code locations are aligned, the planogram data structure 119, is saved at step 126I to computer storage device 119B or centralized computer server 119C. In an embodiment, for each marker code, what is saved is the location of the marker code within the planogram, in physical units (inches) relative to the four selected corners, as well as the identifiers for the item and fixture at that location. The completed planogram program file 119A is available for distribution to retail stores using the PIP system computer program 117, via a computer storage device 119B or a centralized computer server 119C, referring again to FIG. 7A.

Figure 7C:
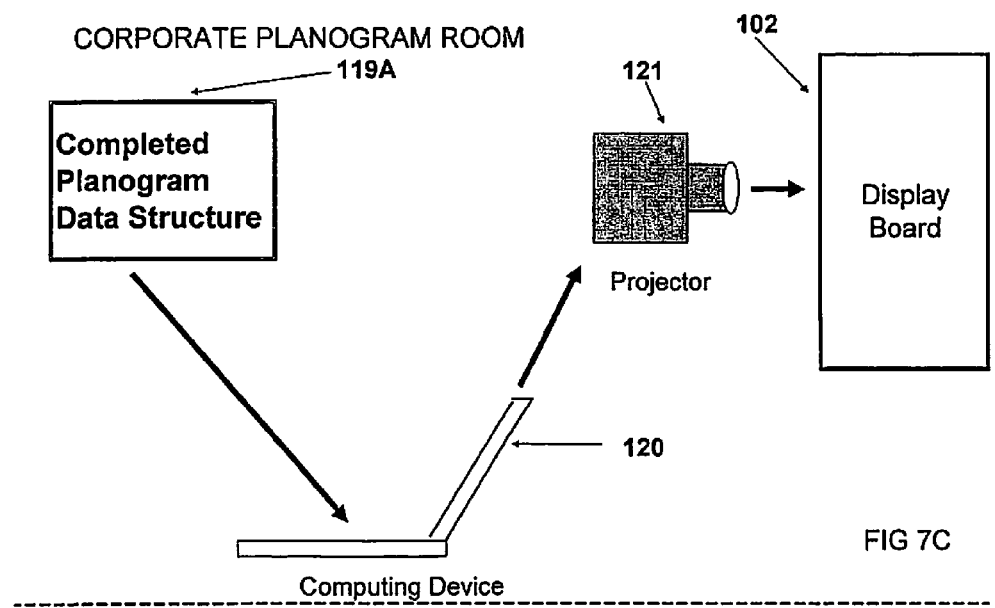
FIG. 7C is a diagram the flow of a completed planogram projected back on the planogram display board, according to an embodiment.

FIG. 7C depicts the flow of the completed planogram file 119A accessed by a user with a computing device 120 such as a laptop computer, notebook computer, smartphone, and so on. In the corporate planogram room. The fixture and merchandise data and their location information are projected onto corporate display board 102 by use of a projector 121 which is connected to the computing device 120.

Figure 7D:
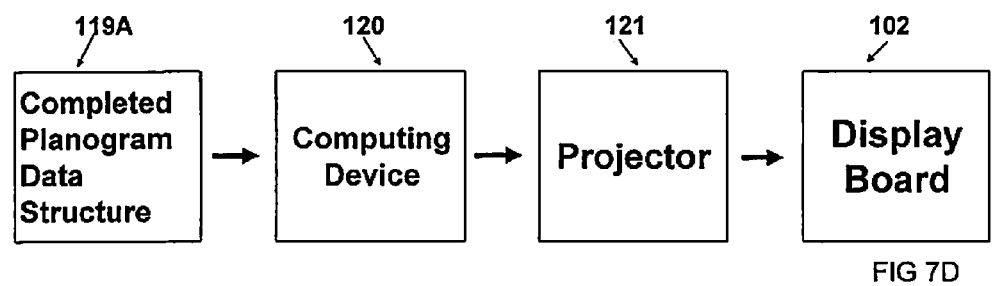
FIG. 7D is a flowchart of the PIP system sending the completed planogram to the corporate computer for projection back onto display boards in the corporate planogram room, according to an embodiment.

FIG. 7D is a flowchart depicting the interaction of the components of embodiments used in the corporate planogram room in which a completed planogram program 119A is sent to a computing device 120 with projector 121 connected, which can project an image of the completed planogram corresponding to the planogram program 119A back on to the display board 102 on which the planogram had been set to confirm the accuracy of the recording of the planogram layout by the PIP system.

Figure 8A:
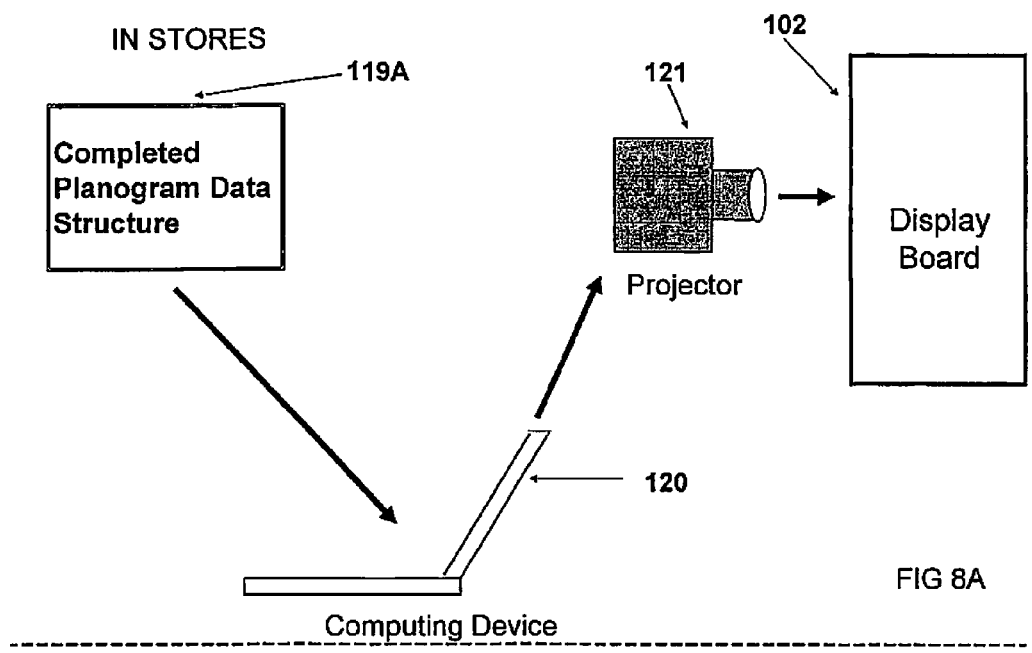
FIG. 8A depicts the flow of the completed planogram program accessed by a computer on the retail sales floor, according to an embodiment.
Figure 8B:
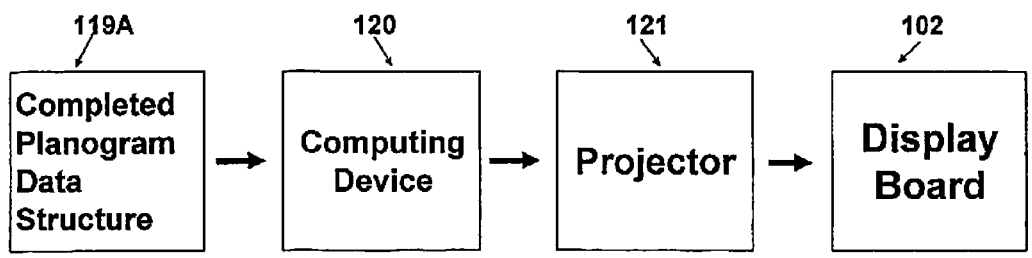
FIG. 8B is a flowchart of the PIP system sending the completed planogram to retail computers for projection onto display boards in various store locations, according to an embodiment.

FIG. 8A depicts the flow of the completed planogram program file 119A accessed by a user with a computing device 120, such as a laptop computer, notebook computer, smartphone, and so on, on the retail sales floor. The fixture and merchandise data and their location information is projected onto the stores display board 102 by use of a projector 121 which is connected to the computing device 120. FIG. 8B is a flowchart showing the interaction of the components of embodiments used in retail stores, in which a completed planogram program 119A is sent to a computing device 120 with projector 121 connected, which projects a planogram image corresponding to the completed planogram program 119A on to the display board 102 on which the planogram is to be set. In an embodiment, the image may comprise images, indicators, or identifiers corresponding to fixtures and merchandise, projected onto the display board 102 at their respective display locations as identified in the completed planogram program 119A.

Figure 8C:
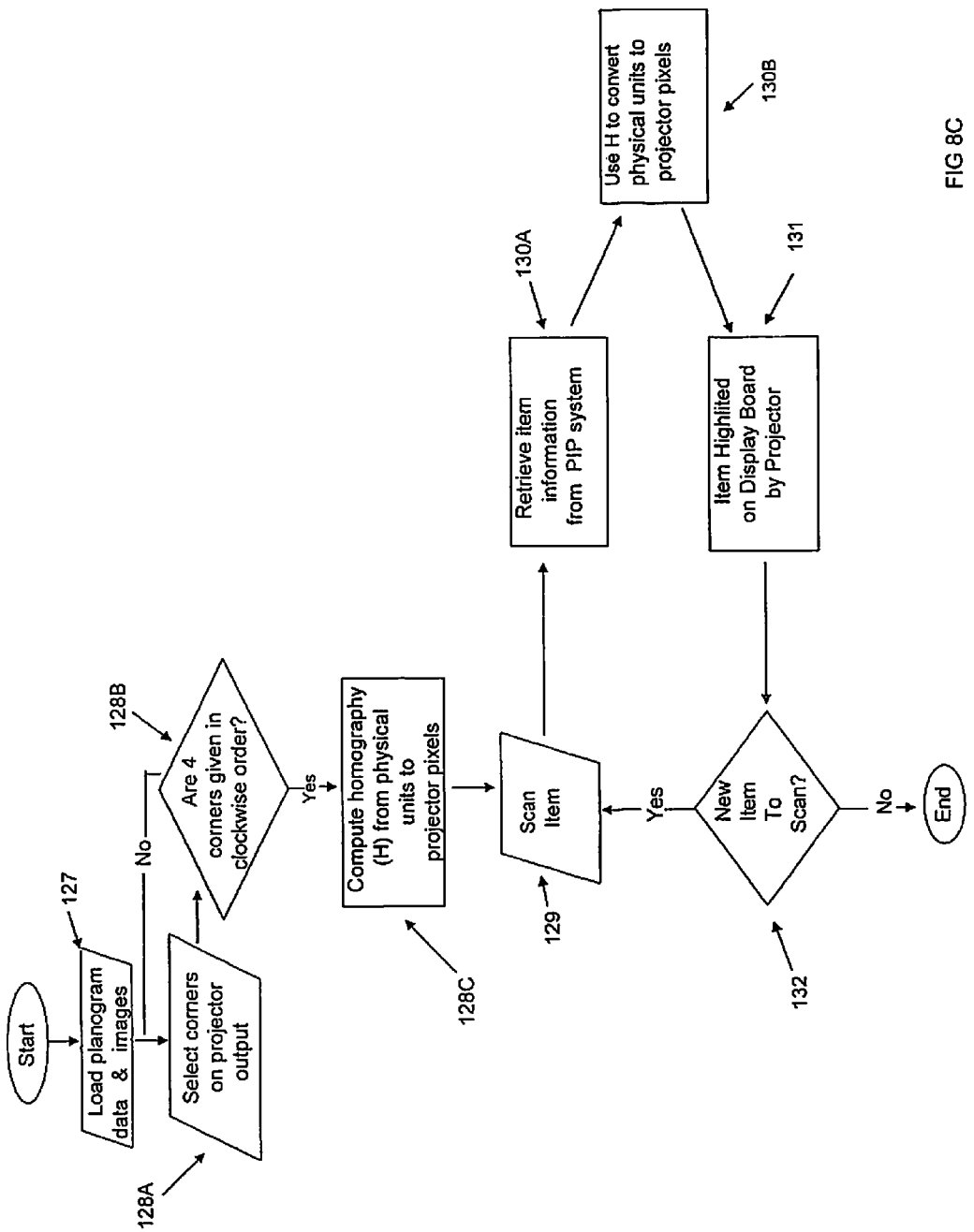
FIG. 8C is a flowchart of an algorithm of the PIP system used at the retail location, according to an embodiment.

The flowchart of FIG. 8C illustrates an algorithm of the PIP system computer program 117 used at the retail location. At step 127, planogram data and images are loaded into the PIP system. Within the PIP system computer system or program, the marker code locations are transformed from physical units to projector pixels at step 128C. In an embodiment, the four corner points are selected by the user 128A. In an embodiment, to work most properly the four corner points must be selected in clockwise order 128B starting at the top left corner point. The four corner points have the same physical relation to each other (width & height) as they did when the planogram was originally created and recorded. These four corner points allow the system to estimate a second homographic perspective transformation from physical units (inches) back to the pixels of the projector 128D.

In an embodiment, the PIP system computer program uses both of these transformations, one at the corporate planogram room 126C, and one at the retail store, 128C to convert the pixels of the camera to the pixels of the projector.

Each fixture 106 has a fixture identifier, which in an embodiment comprises readable marker code 111 and each item of merchandise 107 has a merchandise identifier, which in an embodiment comprises a readable marker code 112, which are identified by using a marker code reader 113, or other accessing method equivalent in its ability to identify merchandise or fixture, as shown at step 129. In an embodiment, what is scanned is a readable marker code, such as a UPC code, but it could be any scannable or readable marker code. The readable marker code for each fixture 111 and item of merchandise 112 within the planogram is scanned using a marker code reader 113 in order to capture that maker code (corresponding to a fixture or merchandise item) and send it to the PIP system computer program 117. In an alternate embodiment, marker codes, fixture identifier and merchandise identifiers can be entered into the system using other methods besides scanning, such as manual data entry, selection from a list on a computer, and so on. Within the PIP system computer program 117 the information read from the scanned or otherwise captured marker code is matched to the same information stored in the data base created for the planogram being set at step 130A. Detailed information about the size and shape of the item scanned, and its location for placement on the planogram, is contained in the database for this planogram within the PIP system computer program 117.

For fixtures 106, the PIP system computer program 117 identifies the type of fixture 106 scanned and all locations where that fixture 106 is to be placed on the planogram 131.

For merchandise 107, the PIP system computer program 117 identifies the size and shape of the item of merchandise 107 scanned, or otherwised identified, and all locations where that item of merchandise 107 is to be placed on the planogram 131.

In an embodiment, physical units for the merchandise size and shape is determined in inches. In an embodiment, the physical unit could be centimeters or any other unit of measure. The size is then used to define a shape region on the display board 102 where the item should be placed. This shape region is then transformed from inches to image pixels at step 130B for projection onto the display board 102 using the transformation from step 128C. Once the shape region in the pixel space of the image is defined, it can either be filled with a solid pixel color, a texture or an item image which provides flexibility in the highlight routine. In embodiments, the blit operation acts to combine several images into one using a raster operator.

This process of scanning, retrieving and projecting is repeated for all marker codes used in the planogram until all fixtures and merchandise have been identified and set on the display board 102, step 132.

Figure 9:
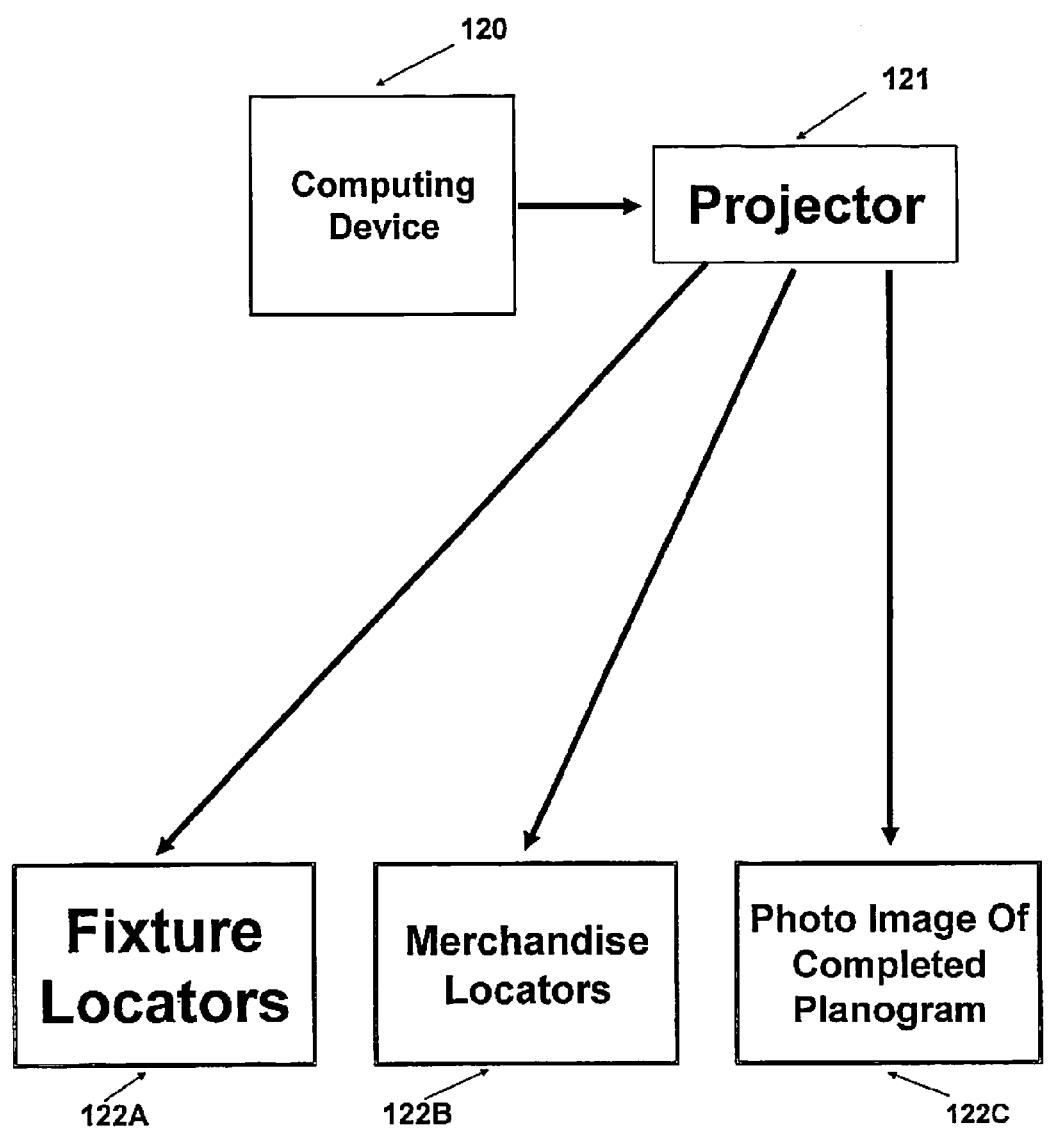
FIG. 9 is a summary of projections embodied within the invention including but not limited to the sending of an image identifying location for placement of fixture locations on display board, an image identifying location for placement of specific merchandise on display board, and a photo image of the finish planogram as set in the corporate planogram room, according to an embodiment.

FIG. 9 depicts a flow chart of the embodiments of the invention showing the various projections that the PIP system computer program 117 provides at retail store locations. An in-store computing device 120 projects these functions onto the store display board 102 by means of a projector 121. The projections from the PIP system computer program 117 provide three distinct functions for setting a planogram in the retail store which replicates exactly the planogram as originally created in the corporate planogram room. These projections contain illuminated fixture locators 122A which identify the location of fixture (fixture display location), illuminated merchandise locators 122B which identify the location of merchandise (merchandise display location), and a photographic image of the completed planogram as set in the corporate planogram room 122C.

Figure 10:
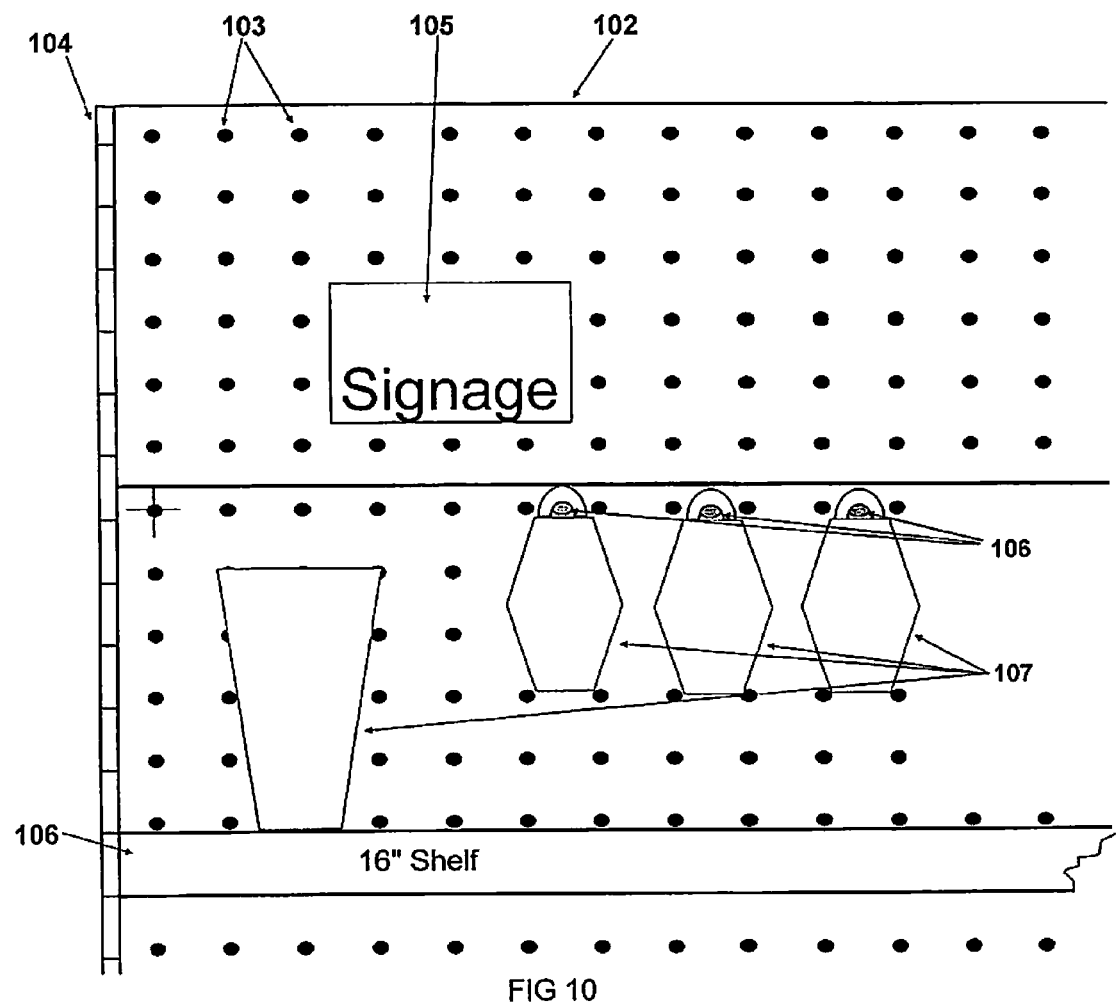
FIG. 10 is an illustration of a portion of a finished planogram once completed and set in stores with fixtures and merchandise displayed to match the original planogram created in the corporate planogram room of FIG. 1, according to an embodiment.

FIG. 10 shows the completed planogram set in the retail store which, in an embodiment, is identical to, or substantially identical to, the planogram originally created in the corporate planogram room, including merchandise display structure 102 with elements 103, 104, 105, and 106, supporting, receiving, or displaying fixtures 106 and merchandise items 107.

Figure 11A:
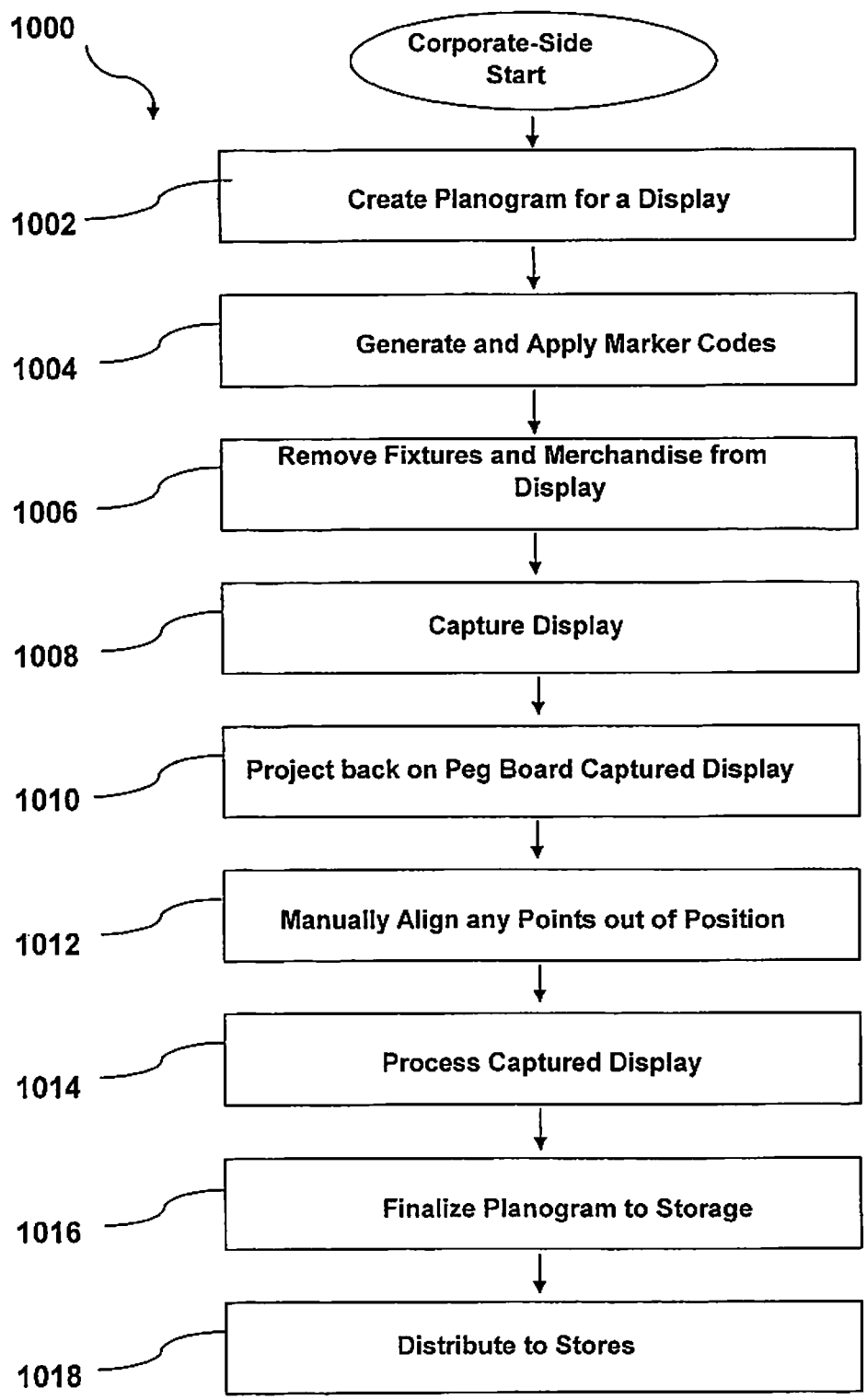
FIG. 11A is a flowchart of a method of generating a planogram on the corporate (or non-store location) side for a display, according to an embodiment.

In operation, referring to FIG. 11A, a method 1000 of generating a planogram on the corporate (or non-store location) side for a display, according to an embodiment, is depicted. At step 1002, the planogram to be displayed at individual retail locations is created. As described above, this typically includes involvement by Senior Buyers, Corporate Planners, Divisional and Senior V.P.s. to create an optimal merchandise display to be replicated in each of the retail locations. Creation of the planogram at 1002 can be done by any known method, including traditional hand-placement methods or online, digital methods with or without subsequent conversion to a physical display. As part of the creation of the planogram, the board height and length of the merchandise display structure will be known or can otherwise be measured. This information can be documented for use later. Optionally, and subsequent to the display being finalized, a digital picture of the entire display can be taken. At 1004, marker codes are generated. In an embodiment, generating marker codes comprises combining merchandise information with fixture information into a single, machine-readable marker code for a specific display fixture. Specifically, each fixture is designated with a specific item of merchandise. In embodiments, marker codes can include other information, including quantity.

Procedurally, at 1004, a fixture identifier or marker code is scanned or otherwise identified or entered into the system. The fixture identifier or marker code identifies the specific fixture to have a particular item of merchandise. For example, the fixture marker code could be a 6" hook, or 12" shelf. After the fixture marker code is scanned or fixgture data captured, the merchandise marker code of the merchandise to be placed on that particular fixture is scanned. For example, merchandise for the 6" hook could be a white spatula, or in the case of the 12" shelf, the merchandise could be a box of envelopes. Once scanned or otherwise captured, the respective fixture or merchandise data is recalled from databases connected to, uploaded to or accessed by the PIP system. The fixture and merchandise data is combined by the system and a marker code containing fixture and the respective merchandise for that fixture is generated for each fixture.

In an embodiment, as marker codes are generated by the PIP system, adhesive marker code labels are printed by a printer connected to the PIP system. In an embodiment, the adhesive marker code labels are affixed to the display at a known location relative to the fixture represented by the respective marker code label. In an embodiment, marker code labels can be affixed immediately above the respective fixtures. In another embodiment, marker code labels can be affixed below, to the side, or at a corner of the respective fixtures.

At step 1006, once the marker code labels are affixed to the display, all of the merchandise is removed from the display. Subsequently, all of the fixtures are removed from the display. The display is thus left with just the affixed marker codes, which were placed appropriately to represent fixture locations. In an embodiment, the display board is thus emptied.

At step 1008, the display is digitally captured, which may comprise capturing a digital image of the display. In an embodiment, the digital capture is with a digital camera. In other embodiments, a scanner, laser, or any other suitable image capture device is utilized.

At step 1010, the captured display is projected back onto the planogram display board which still has all of the marker codes attached. In an embodiment, each fixture readable code beam of light and merchandise readable code beam of light is then projected back on to the display board to confirm that all of the individual beams of light align with their corresponding marker code locations, which contain both the fixture and merchandise readable marker codes. Although beams of light, such as colored beams of light that form a lighted spot or image on the display structure, are used in an embodiment to indicate display locations of fixtures and merchandise, other images may be projected to indicate display locations, such as actual images of the fixtures or merchandise.

At step 1012, if any points of light that do not align with their corresponding marker codes, the positions can be manually moved into proper alignment using the PIP system manual adjustment function.

At step 1014, the captured display is processed by the PIP system. In an embodiment, the previously-recorded display height and length are entered into the system for processing of the captured image. Referring to FIG. 7B, a processing algorithm according to an embodiment is depicted. Thus, a processed planogram output data structure is generated. In an embodiment, the processed planogram output file can be a .yaml file, or other similar file or data structure. The processed data can be output into other suitable data formats. In an embodiment, the optional digital image of the fully assembled planogram can be incorporated into the planogram output file.

At step 1016, the finalized planogram is moved to computer storage device 119B or centralized computer server 119C, thereby finishing the corporate planogram process. In another embodiment, the finished planogram can be moved to cloud storage for ease of subsequent access.

At step 1018, the processed planogram output file can be distributed to individual retail stores. In an embodiment, the processed planogram output file is emailed to individual retail stores. In other embodiments, physical delivery of an electronic copy of the processed planogram output file via a storage device is also possible, for example with a flash drive, writable disc (CD, DVD, etc.), or portable hard drive. In another embodiment, the processed planogram output data structure is stored in a centralized database, which may be stored on a server, which may be cloud based, and accessible by the individual retail stores.

Figure 11B:
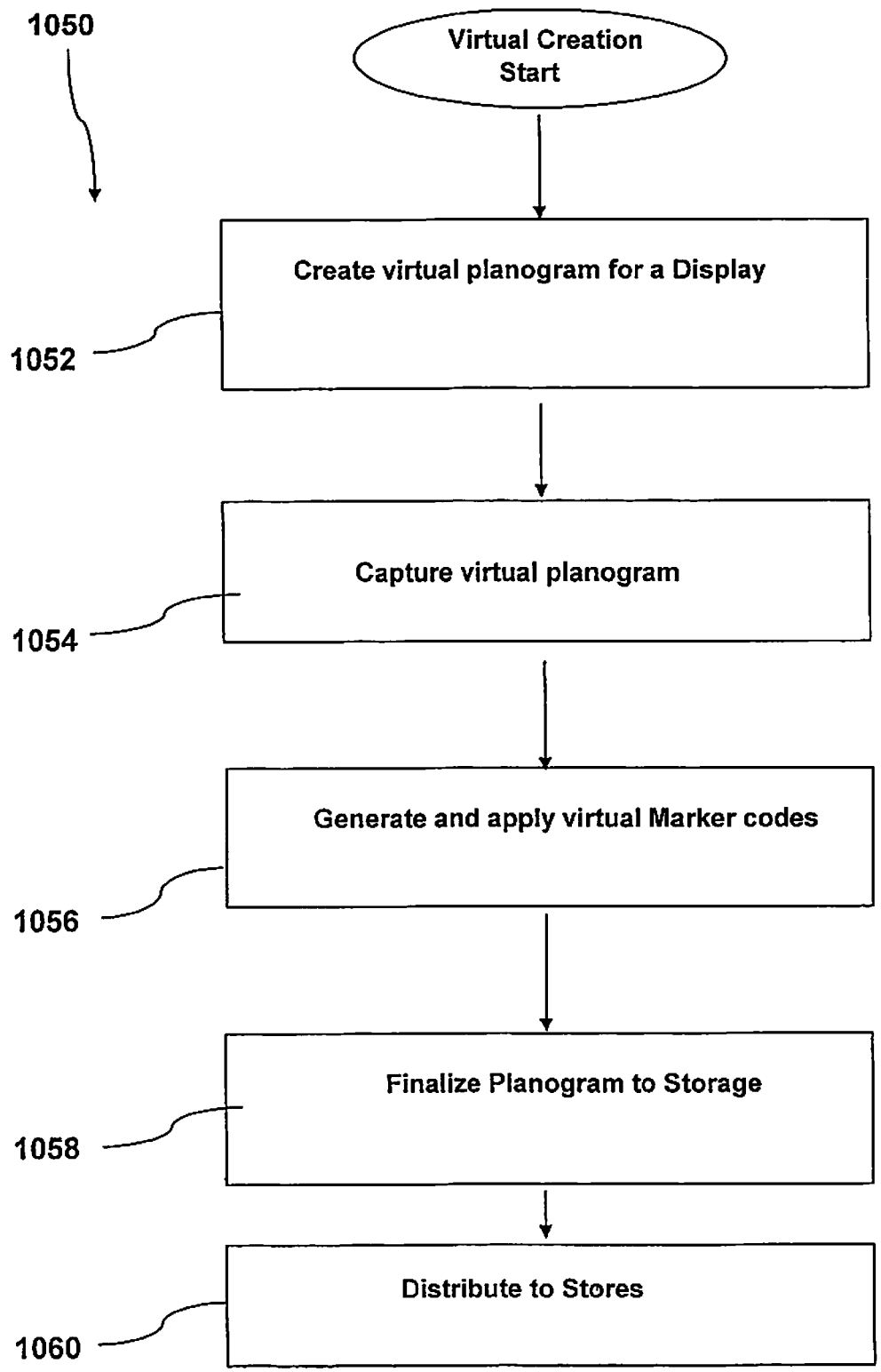
FIG. 11B is a flowchart of a method of virtually generating a planogram and subsequent processing on the corporate (or non-store location) side for a display, according to an embodiment.

Referring to FIG. 11B, a method 1050 of processing a virtually-created planogram is depicted. At step 1052, the virtual planogram for a display is created. Planning professionals can individually or collaboratively use system software to create customized planograms. Layouts of any desired merchandising display can thereby be virtually created. This may be via collaboration online or via a networked system or individually by a particular planner at a single terminal or combination of system terminals. In an embodiment, each item of merchandise 107 and the fixture 106 on which that merchandise is displayed (peg hook, shelf, divider, hanger, etc.) can be virtually accessed or selected and subsequently virtually manipulated to be in a desired position. Revisions or iterations of the planogram display can be created in finalizing the planogram.

Once the planogram is defined, a virtual image can be recorded of that completed planogram at step 1054. This image can be subsequently used to set the display in retail stores just as the digital picture taken of the physical display can be projected onto the display board in retail stores to give an indication of the position of the fixtures and merchandise.

At step 1056, computer program 117 can access the details of each item of merchandise and the fixtures on which the merchandise is displayed, as the data will be stored or accessible by the system because each piece was virtually installed on the virtual display. These data can be merged to create a unique marker code for the respective merchandise and supporting fixture. The unique marker code for the merchandise and supporting fixture can then be applied to the virtual display by virtually positioning the marker code within the planogram file or image, just as in the physical display embodiment.

At step 1058 the finalized planogram is moved to computer storage device 119B or centralized computer server 119C, thereby finishing the planogram creation (non-store side) process. In another embodiment, the finished planogram can be moved to cloud storage, or other storage, for ease of subsequent access.

At step 1060, the processed planogram output file can be distributed to individual retail stores. In an embodiment, the processed planogram output file is emailed to individual retail stores. In other embodiments, physical delivery of an electronic copy of the processed planogram output file via a storage device is also possible, for example with a flash drive, writable disc (CD, DVD, etc.), or portable hard drive. In another embodiment, the processed planogram output file is stored in a centralized database, which may be stored on a server, which may be cloud based, and accessible by the individual retail stores.

In an embodiment, prior to capturing the virtual planogram 1054 or instead of creating a virtual planogram 1052 by computer program 117, the PIP system accepts as an input a planogram image or other suitable planogram file created outside of the PIP system (not shown). In such an embodiment, the inputted planogram image or planogram file can be created by any number of commercially available planogramming software products or other virtual applications or web-based interfaces. In embodiments, the inputted image or file can be manipulated within the system. In another embodiment, the inputted image or file can be subsequently converted into a file or type typically utilized within the system.

In an embodiment where a planogram image or file is inputted, capturing the virtual planogram contents at 1054 comprises using image recognition algorithms to identify fixtures and merchandise within the image or file. In another embodiment, the inputted image can contain identifying marker code data to identify each fixture and piece of merchandise within the planogram. Other suitable identifying procedures or algorithms are also contemplated. Each fixture and piece of merchandise is then identified.

Likewise, in the embodiment, a unique marker code for the merchandise and supporting fixture can then be generated at step 1056 by virtually positioning the marker code within the inputted or subsequently-generated file. Processing can then proceed as described above with the planogram moved to a storage device, for example a flash drive, hard drive, writable disc (CD, DVD, etc.), or portable hard drive, on to cloud storage, etc. for distribution to retail stores.

Figure 12:
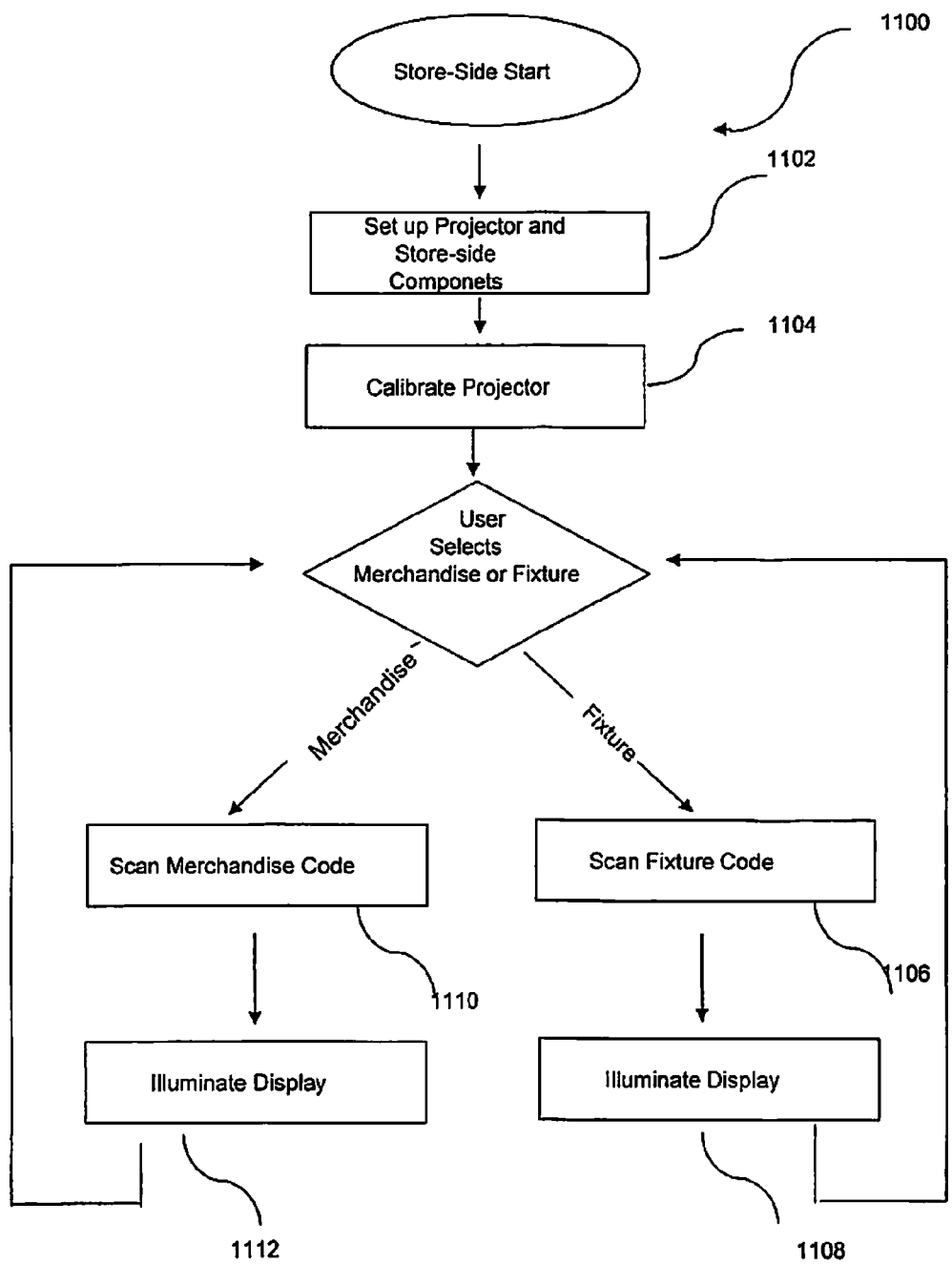
FIG. 12 is a flowchart of a method of installing the planogram in a retail location developed in the corporate or non-store location, according to an embodiment.

Referring to FIG. 12, a method of setting or installing 1100 the planogram developed in the corporate or non-store location is depicted. Typically, method of installing 1100 is done in the retail store after completion of method 1000 of generating in the corporate or virtual environment.

At step 1102, the retail-side software is loaded into a computing device. A short throw projector and marker code reader may be coupled to or imbedded in the computing device. The projector is positioned in front of the display area where the planogram is to be recreated, installed or set.

At step 1104, the projector may be calibrated. Because the projector can be any distance away from the display, as long as the projection covers the entire, or otherwise appropriate area, display, the projector can be calibrated to the particularly set distance. The retail-side software prompts the user to select the four corners in a clockwise direction. The homography from physical units to projector pixels can then be calculated. Once the homography is calculated, physical units to projector pixels can be converted. Other calibration methods are also considered. For example, the projector could be set up a known distance from the display, or other display area interactions could be conducted.

Optionally, and not shown in FIG. 12, the optional digital picture taken of the entire display with merchandise and fixtures on the display can be projected onto the empty display to give a visual position of the fixtures and merchandise.

At step 1106, a fixture marker code, or other such fixture identifier, is scanned by the user with the coupled marker code reader, or alternatively, fixture identifier or code information is otherwise captured and entered. The fixture-specific data is subsequently retrieved from a fixture database.

At step 1108, the display is illuminated and the fixture location and in some embodiments, shape, are highlighted or projected onto the merchandise display structure by the projector. In an embodiment, all of the fixtures are first installed onto the display prior to any merchandise items. Thus, as depicted in FIG. 12, additional fixture marker codes can be scanned at 1106 after the display is illuminated at 1108. However, the system allows for the scanning of fixtures or merchandise in any order.

At step 1110, a merchandise marker code, or other such merchandise identifier, is scanned by the user with the coupled marker code reader. The merchandise-specific data is subsequently retrieved from a merchandise database. In an embodiment, the merchandise and fixture databases are in the same database.

At step 1112, the display is illuminated and the merchandise location and shape are highlighted on the projector. Additional merchandise marker codes can be scanned at 1110 after the display is illuminated at 1112. Further, if a particular fixture was inadvertently missed, it can be scanned again at 1106. As described, the system allows for the scanning and display of fixtures or merchandise in any order.

FIG. 8C further depicts the flow of the steps of 1104 through 1112 with respect to the software processing.

As described above, the present invention provides various techniques for improving the efficiency and efficacy for recording a planogram and recreating that planogram in one location or at a plurality of locations. In particular, this is achieved through the application of image recording captured within the planogram design environment. In addition, through the collecting and merging of merchandise and fixture data, systems and marker codes are created for capture of design and to insure more efficient recreation of that design at remote locations. The use of the Projected Image Planogram system (PIP system) assures accuracy in recreating the planogram to match the planogram as originally conceived, designed, and approved. For at least these reasons, the above described techniques represent advancement over prior art teachings, and over current methods of planogramming.

One such embodiment includes a method of generating a planogram for a retail display, the method comprising: selecting a merchandise item having a merchandise identifier; selecting a fixture associated with the merchandise item, the fixture having a fixture identifier; determining a display location for the fixture or for the merchandise item, the display location being one of a plurality of display locations of a merchandise display structure, the merchandise display structure being configured to receive the fixture and to display the merchandise item; generating a marker code based on the merchandise identifier and the fixture identifier, the marker code identifying the merchandise item and the fixture; and generating a planogram data file, the planogram data file including data corresponding to the marker code and the display location, the marker code identifying the merchandise and fixture.

In one such embodiment, the marker code comprises a scannable or otherwise machine-readable code.

In an embodiment, the method further comprises causing a representation of the marker code to be displayed at or adjacent the determined display location of the merchandise display structure.

In an embodiment, in the method, causing a representation of the marker code to be displayed at the determined display location of the merchandise display structure comprises printing a label bearing the marker code and affixing the label to the merchandise display structure adjacent the determined display location. In one such embodiment, the method further comprises capturing an image of the merchandise display structure, including an image of the representation of the marker code displayed at the display location of the merchandise display structure, and generating the planogram data file comprises analyzing the image of the representation of the marker code to determine the merchandise item and the fixture item imbedded in the marker code.

In an embodiment, the method also comprises attaching the fixture and the merchandise item to the merchandise display structure, imaging the merchandise display structure with the fixture and merchandise item, removing the fixture and the merchandise item from the merchandise display structure, affixing a representation of the marker code to the merchandise display, and imaging the merchandise display structure with the representation of the marker code. In one such embodiment, generating the planogram data file comprises analyzing the image of the representation of the marker code to determine the merchandise item code and the fixture item code or otherwise identifying the fixture item and merchandise item associated with the marker code.

In an embodiment, the method further comprises designing the planogram using planogram software, arranging the fixture and the merchandise item on a virtual merchandise display structure, capturing an image of the virtual planogram showing the fixture and merchandise item, affixing, within the planogram design a representation of the marker code corresponding to the item of merchandise and related fixture, or otherwise identifying that merchandise item and fixture and its location within the planogram, and capturing an image of the planogram displaying the marker code or other location for display identifier.

In an embodiment, the method further comprises scanning the merchandise identifier and scanning the fixture identifier and using the scanned merchandise identifier and fixture identifier to generate the marker code. In one such embodiment, the merchandise identifier code comprises a barcode or a matrix code or other readable code and the fixture identifier code comprises a barcode or a matrix code or other readable code.

In an embodiment, the method further comprises selecting the merchandise identifier and fixture identifier from a database and using the data base to generate the marker code.

In an embodiment, the marker code is selected from the group consisting of a one-dimensional barcode, a two-dimensional matrix code, and a three-dimensional matrix code. In one such embodiment, the marker code comprises a Universal Product Code (UPC), QR code, PDF 417 code, EAN code, Aztec code, Data Matrix code or Codabar code.

Another embodiment of the claimed invention comprises a method of installing a planogram that includes one or more merchandise items and one or more fixtures associated with the items for placement on a merchandise display structure, the method comprising: accessing a planogram data file, the planogram data file including information describing the planogram, including information identifying a merchandise display structure, the one or more merchandise items, and the one or more fixtures associated with the merchandise items; scanning a fixture code of a first fixture, or otherwise identifying the first fixture; projecting an image associated with the first fixture onto the merchandise display structure at a first fixture display location; placing the fixture at the first fixture display location; scanning a merchandise code of a first merchandise item, or otherwise identifying the first merchandise item; projecting an image associated with the first merchandise item onto the merchandise display structure at a first merchandise item display location; and placing the merchandise item at the first merchandise item display location.

In an embodiment, the fixture code is scanned prior to the merchandise code, and the fixture code and the merchandise code comprise machine-readable marker codes. In one such embodiment, the machine-readable marker codes comprise one of a barcode or a matrix code or other readable code identifying a fixture or merchandise item.

In an embodiment, the method further comprises scanning a merchandise code of a second merchandise item and causing an image associated with the first merchandise item to be projected onto the merchandise display structure at a second merchandise item display location. In one such embodiment, the method further comprises projecting an image of a completed planogram onto the merchandise display structure, the image including images of all of the merchandise items to be placed on the merchandise display structure and/or further comprises projecting a colored beam of light at the first merchandise display location to identify the first merchandise display location to a user placing the first merchandise item on the merchandise display structure. In one such embodiment, the method further comprises projecting a colored beam of light at the first fixture display location to identify the first fixture display location to a user placing the first fixture on the merchandise display structure.

In an embodiment, the claimed invention includes a planogram system for assembling a planogram, comprising: a merchandise display structure configured to receive a plurality of merchandise fixtures and a plurality of merchandise items, each of the plurality of merchandise fixtures configured to join one or more of the merchandise items to the merchandise display structure, each of the plurality of merchandise fixtures having a fixture identifier, and each of the plurality of merchandise items having a merchandise identifier; a scanning device configured to scan the fixture identifiers and the merchandise item identifiers; a computer communicatively coupled to the scanning device and configured to access planogram data corresponding to the merchandise fixtures, merchandise fixture display locations of the merchandise display structure, merchandise items, and merchandise item display locations of the merchandise display structure; and a projector communicatively coupled to the computer and configured to receive data from the computer and to project an image onto the merchandise display structure based upon the data received from the computer, the image identifying a merchandise fixture display location.

In an embodiment, the image further identifies a merchandise item display location.

In an embodiment, the image identifying the merchandise fixture display location comprises a colored beam of light.

In an embodiment, the merchandise identifier and the fixture identifier each comprise readable code.

Other embodiments of the invention are possible without departing from the spirit of the invention. While particular embodiments have been shown or used as descriptors, changes and modifications may be made without departing from the instant teachings. For example, where specific examples describe shelves or peg hooks, it is understood that other types of fixtures or product display devices, e.g. vertical display racks, specialize fixtures, product specific fixturing, and custom merchandise holders, could be equally employed. Display board and display board equivalents of merchandise display structures, such as slat boards, peg board, racking and custom made display sections would also apply. While the embodiments described include images and location identification markings projected, all performed by means of a projector, this description of these embodiments is not so limiting as to be construed as just one manner or one type of marking for identifying locations (of merchandise or fixturing) or one image projection of the planogram or aspects of the planogram, but includes all methods and manners of projecting or viewing projected images and illuminated markings that may be used for such purposes or for improved application or function of the embodiments of this invention.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A method of generating a planogram for a retail display, the method comprising:
    selecting a merchandise item having a merchandise identifier;
    selecting a fixture associated with the merchandise item, the fixture having a fixture identifier;
    determining a display location for the fixture or for the merchandise item, the display location being one of a plurality of display locations of a merchandise display structure, the merchandise display structure being configured to receive the fixture and to display the merchandise item;
    generating a marker code based on the merchandise identifier and the fixture identifier, the marker code identifying the merchandise item and the fixture; and
    generating a planogram data file, the planogram data file including data corresponding to the marker code and the display location, the marker code identifying the merchandise and fixture.

2. The method of claim 1, wherein the marker code comprises a scannable or otherwise readable code.

3. The method of claim 1, further comprising causing a representation of the marker code to be displayed at or adjacent the determined display location of the merchandise display structure.

4. The method of claim 3, wherein causing a representation of the marker code to be displayed at the determined display location of the merchandise display structure comprises printing a label bearing the marker code and affixing the label to the merchandise display structure adjacent the determined display location.

5. The method of claim 3, further comprising capturing an image of the merchandise display structure, including an image of the representation of the marker code displayed at the display location of the merchandise display structure.

6. The method of claim 5, wherein generating the planogram data file comprises analyzing the image of the representation of the marker code to determine the merchandise item and the fixture item imbedded in the marker code.

7. The method of claim 6, wherein generating the planogram data file comprises analyzing the image of the representation of the marker code to determine the merchandise item identifier and the fixture item identifier or otherwise identifying the fixture item and merchandise item associated with the marker code.

8. The method of claim 1, further comprising attaching the fixture and the merchandise item to the merchandise display structure, imaging the merchandise display structure with the fixture and merchandise item, removing the fixture and the merchandise item from the merchandise display structure, affixing a representation of the marker code to the merchandise display, and imaging the merchandise display structure with the representation of the marker code.

9. The method of claim 1, further comprising designing the planogram using planogram software, arranging the fixture and the merchandise item on a virtual merchandise display structure, capturing an image of the virtual planogram showing the fixture and merchandise item, affixing, within the planogram design, a representation of the marker code corresponding to the merchandise item and the fixture, or otherwise identifying the merchandise item and fixture and the location of the merchandise item within the planogram, and capturing an image of the planogram displaying the marker code.

10. The method of claim 1, further comprising scanning the merchandise identifier and scanning the fixture identifier and using the scanned merchandise identifier and fixture identifier to generate the marker code.

11. The method of claim 10, wherein the merchandise identifier comprises a barcode or a matrix code or other readable code and the fixture identifier code comprises a barcode or a matrix code or other readable code.

12. The method of claim 1, further comprising selecting the merchandise identifier and fixture identifier from a database and using the database to generate the marker code.

13. The method of claim 1, wherein the marker code is selected from the group consisting of a one-dimensional barcode, a two-dimensional matrix code, and a three-dimensional matrix code.

14. The method of claim 13, wherein the marker code comprises a Universal Product Code (UPC), QR code, PDF 417 code, EAN code, Aztec code, Data Matrix code or Codabar code.

15. A method of installing a planogram that includes one or more merchandise items and one or more fixtures associated with the items for placement on a merchandise display structure, the method comprising:
- accessing a planogram data file, the planogram data file including information describing the planogram, including information identifying a merchandise display structure, the one or more merchandise items, and the one or more fixtures associated with the merchandise items;
- scanning a fixture code of a first fixture, or otherwise identifying the first fixture;
- projecting an image associated with the first fixture onto the merchandise display structure at a first fixture display location;
- placing the fixture at the first fixture display location;
- scanning a merchandise code of a first merchandise item, or otherwise identifying the first merchandise item;
- projecting an image associated with the first merchandise item onto the merchandise display structure at a first merchandise item display location; and
- placing the merchandise item at the first merchandise item display location.

16. The method of claim 15, wherein the fixture code is scanned prior to the merchandise code.

17. The method of claim 15, wherein the fixture code and the merchandise code comprise readable marker codes.

18. The method of claim 17, wherein the readable marker codes comprise one of a barcode or a matrix code or other readable code.

19. The method of claim 17, wherein the readable marker code comprises information identifying a fixture or merchandise item.

20. The method of claim 15, further comprising scanning a merchandise code of a second merchandise item and causing an image associated with the first merchandise item to be projected onto the merchandise display structure at a second merchandise item display location.

21. The method of claim 20 further comprising projecting an image of a completed planogram onto the merchandise display structure, the image including images of all of the merchandise items to be placed on the merchandise display structure.

22. The method of claim 21, further comprising projecting a colored beam of light at the first merchandise display location to identify the first merchandise display location to a user placing the first merchandise item on the merchandise display structure.

23. The method of claim 21, further comprising projecting a colored beam of light at the first fixture display location to identify the first fixture display location to a user placing the first fixture on the merchandise display structure.

24. A planogram system for assembling a planogram, comprising:
- a merchandise display structure configured to receive a plurality of merchandise fixtures and a plurality of merchandise items, each of the plurality of merchandise fixtures configured to join one or more of the merchandise items to the merchandise display structure, each of the plurality of merchandise fixtures having a fixture identifier, and each of the plurality of merchandise items having a merchandise identifier;
- a computer communicatively coupled to a scanning device and configured to access planogram data corresponding to the merchandise fixtures, merchandise fixture display locations of the merchandise display structure, merchandise items, and merchandise item display locations of the merchandise display structure; and
- a projector communicatively coupled to the computer and configured to receive data from the computer and to project an image onto the merchandise display structure based upon the data received from the computer, the image identifying a merchandise fixture display location.

25. The system of claim 24, wherein the image further identifies a merchandise item display location.

26. The system of claim 24, wherein the image identifying the merchandise fixture display location comprises a colored beam of light.

27. The system of claim 24, wherein the merchandise identifier and the fixture identifier each comprise readable code.

28. The system of claim 24, further comprising a scanning device communicatively coupled to the computer and configured to scan the fixture identifiers and the merchandise item identifiers.

* * * * *